United States Patent
Venkataraman et al.

(10) Patent No.: US 12,511,555 B2
(45) Date of Patent: Dec. 30, 2025

(54) SYSTEMS AND METHODS FOR DE-BIASING CAMPAIGN SEGMENTATION USING MACHINE LEARNING

(71) Applicant: Oracle International Corporation, Redwood Shores, CA (US)

(72) Inventors: Madalasa Venkataraman, Bengaluru (IN); Paul Deepakraj Retinraj, Fremont, CA (US); Dinesh Ghanta, Bengaluru (IN); Girish Nautiyal, Bengaluru (IN)

(73) Assignee: Oracle International Corporation, Redwood Shores, CA (US)

( * ) Notice: Subject to any disclaimer, the term of this patent is extended or adjusted under 35 U.S.C. 154(b) by 1109 days.

(21) Appl. No.: 17/370,875

(22) Filed: Jul. 8, 2021

(65) Prior Publication Data

US 2023/0008904 A1     Jan. 12, 2023

(51) Int. Cl.
   *G06N 5/04*        (2023.01)
   *G06N 20/00*       (2019.01)
   *G06Q 30/0251*     (2023.01)

(52) U.S. Cl.
   CPC ............... *G06N 5/04* (2013.01); *G06N 20/00* (2019.01); *G06Q 30/0254* (2013.01)

(58) Field of Classification Search
   CPC .................................. G06N 5/04; G06F 18/40
   See application file for complete search history.

(56) References Cited

U.S. PATENT DOCUMENTS

2017/0330058 A1 * 11/2017 Silberman .............. G06N 20/00
2020/0082299 A1 *  3/2020 Vasconcelos .......... G06N 20/00

OTHER PUBLICATIONS

Hall, Mark A. Correlation-based feature selection for machine learning. Diss. The University of Waikato, 1999. (Year: 1999).*
Bellamy RK, Dey K, Hind M, Hoffman SC, Houde S, Kannan K, Lohia P, Martino J, Mehta S, Mojsilovi A, Nagar S. AI Fairness 360: An extensible toolkit for detecting and mitigating algorithmic bias. IBM Journal of Research and Development. Sep. 18, 2019;63(4/5):4-1 (Year: 2019).*

(Continued)

*Primary Examiner* — Schyler S Sanks
(74) *Attorney, Agent, or Firm* — Mughal Gaudry & Franklin PC

(57) ABSTRACT

For at least a selected class attribute of the multiple class attributes, one or more bias metrics are determined that estimate a degree to which a particular workflow (having a set of processing stages) is biased in association with the class attribute. Each user of a set of users is associated with a set of user data to be processed by the particular workflow. At least one of the set of processing stages includes executing a machine-learning model. It can be detected that a bias-mitigation option corresponding to a specific class attribute has been selected. For each of at least two of the set of processing stages: a de-biasing technique is selected; and the processing stage is modified by applying the de-biasing technique. A modified version of the particular workflow (which includes the modified processing stages) is applied to each of a set of input data sets.

25 Claims, 17 Drawing Sheets

(56) References Cited

OTHER PUBLICATIONS

Kamishima, T., Akaho, S., Asoh, H., Sakuma, J. (2012). Fairness-Aware Classifier with Prejudice Remover Regularizer. In: Flach, P.A., De Bie, T., Cristianini, N. (eds) Machine Learning and Knowledge Discovery in Databases. ECML PKDD 2012. Lecture Notes in Computer Science( ), vol. 7524. (Year: 2012).*
Calmon; Flavio P., Dennis Wei, Karthikeyan Nates an Ramamurthy, Kush R. Varshney. "Optimized Data Pre-Processing for Discrimination Prevention", Conference on Neural Information Processing Systems, Apr. 11, 2017, 18 Pages.
Feldman; Michael, Sorelle Friedler, John Moeller, Carlos Scheidegger, Suresh Venkatasubramanian, "Certifying and removing disparate impact", ACM SIGKDD International conference on Knwoledge Discovery and Data Mining, Jul. 16, 2015, 28 pages.
Hardt; Moritz, Eric Price, Nathan Srebro, "Equality of Opportunity in Supervised Learning", 30th Conference on Neural Information Processing Systems (NIPS 2016), Oct. 7, 2016. 22 pages.
Kamiran; F., Asim Karim, X. Zhang, "Decision Theory for Discrimination-Aware Classification", 2012 IFFE 12th International Conference on Data Mining, Dec. 10, 2012, 6 pages.
Kamishima; Toshihiro , Shotaro Akaho , Hideki Asoh , and Jun Sakuma "Fairness-aware Classifier with Prejudice Remover Regularizer", Proceedings of the European Conference on Machine Learning and Principles and Practice of Knowledge Discovery in Databases (ECMLPKDD), Part II, pp. 35-50, Sep. 24-28, 201216 pages.
Pleiss; Geoff, Manish Raghavan, Felix Wu, Jon Kleinberg, Kilian Q. Weinberger, "On Fairness and Calibration", Proceedings of the 31st International Conference on Neural Information Processing Systems Dec. 2017, 19 pages.
Zemel; Rich, Yu Wu, Kevin Sw ersky, ToniPitassi, Cynthia Dw ork, "Learning Fair Representations", Proceedings of the 30th International Conference on Machine Learning, PMLR 28(3):325-333, Jun. 1-Jun. 21, 2013.
Zhang; B. H., B. Lemoine, and M. Mitchell, "Mitigating Unw anted Biases with Advers arial Learning," Intelligence, Ethics, and Society, Jan. 22, 2018, 7 pages.

* cited by examiner

| User Attribute | Heuristic Level | Current Fairness | De-Bias? |
|---|---|---|---|
| Gender: | 13% | 20% | |
| Race: | 38% | 24% | X |
| Age: | 10% | 15% | |
| National Origin: | 90% | 72% | X |
| Religion | 95% | 96% | |
| Familial Status | 95% | 75% | X |
| Veteran Status | 80% | 81% | |
| Disability Status: | 5% | 1% | X |

FIG. 3A

Workflow Performance in Relation to Class of: _Veteran Status_

Accuracy

Observed Accuracy (Average ± Std)     92% ± 7.5%

Minimum Acceptable Accuracy:     80%

Fairness

Observed Fairness (Average ± Std)     65% ± 23%

Minimum Acceptable Fairness:     75%

( Initiate De-Biasing )      ( Return to Home )

FIG. 3B

| | Baseline Population | Training Set | Median Model Output | Contribution to Offer Population |
|---|---|---|---|---|
| American Indian or Alaska Native | 1.30% | 2% | 6.5 | 0.10% |
| Asian | 5.90% | 1.40% | 180 | 2.40% |
| Black or African American | 13.40% | 2.90% | 69 | 2.10% |
| Hispanic or Latino | 18.50% | 8.60% | 128 | 10.30% |
| Native Hawaiian or Other Pacific Islander | 0.20% | 0% | 0 | 0% |
| White | 76.30% | 82% | 103 | 84% |
| Two or More Races | 2.80% | 3.10% | 35 | 1.10% |

FIG. 12A

CHANGE IN STAGE-SPECIFIC BIAS AFTER APPLYING DE-BIASING ALGORITHM

| | Pre-Processing | | | Model Processing | | | Post-Processing | | |
|---|---|---|---|---|---|---|---|---|---|
| | Algorithm A1 | Algorithm A2 | Algorithm A3 | Algorithm B1 | Algorithm B2 | Algorithm C1 | Algorithm C2 | Algorithm C3 | |
| American Indian or Alaska Native | 0.0% | 0.5% | 0.0% | -8.2% | 13.4% | 2.0% | 0.0% | 0.0% |
| Asian | 0.3% | 4.2% | 150.3% | 4.0% | 5.1% | 6.4% | -5.3% | -0.2% |
| Black or African American | -0.4% | 3.5% | 18.6% | -26.3% | 36.0% | 8.7% | 2.4% | 0.0% |
| Hispanic or Latino | 15.7% | 3.4% | 57.4% | 1.1% | 32.9% | 13.0% | 2.5% | 1.7% |
| Native Hawaiian or Other Pacific Islander | 18.1% | 6.2% | 13.8% | -1.5% | 19.2% | -4.0% | 1.1% | -3.8% |
| White | -3.3% | -3.0% | -37.4% | 0.0% | 4.8% | -0.7% | 2.5% | 0.0% |
| Two or More Races | 2.0% | 2.4% | -3.5% | -4.6% | 13.0% | 1.9% | 0.3% | -0.4% |

FIG. 12B

SYSTEMS AND METHODS FOR DE-BIASING CAMPAIGN SEGMENTATION USING MACHINE LEARNING

FIELD

The present application relates generally to systems and methods for facilitating the detection of and the mitigation of bias in computational workflows, particularly those computational workflows that use machine-learning models. More specifically, techniques relate to de-biasing pre-processing (including training data), models, and post-processing in a dynamic manner that improves fairness of results, while safeguards for result accuracy and specificity can be implemented.

BACKGROUND

Machine-learning models are becoming more frequently used to transform input data sets into potentially actionable results. These machine-learning models are trained using training data sets, which result in the models learning parameters that then influence how subsequently received input data sets are processed. As the size of available computational resources and networks have increased, more complex machine-learning models have been developed and larger training data sets are attainable. While more sophisticated models and larger training data sets have the potential to provide more accurate and precise results, a downside is that it may be more difficult to interpret how and why a given input data set is being transformed into a given result.

One particular concern is that a machine-learning model or use thereof may produce results that are biased towards providing favorable results for a particular type of user. For example, in the marketing context, a workflow that uses a machine-learning model may influence or dictate what types of marketing campaigns (e.g., discounts, product availabilities, etc.) are sent to particular user sets, price selection, and/or messages included in communications.

A bias in pertaining to a machine-learning model may arise due to (for example) a skewed training data set, sub-optimal initial selection of a model architecture or model hyperparameters, and/or bias-inducing post-processing. In some cases, implementing a workflow that is biased may be illegal and/or may offend the entity itself or others who may become aware of the bias. For example, a biased training data set that under-represents people of a given race relative to people of other races (e.g., generally or in association with a particular label) may result in a model that has learned to generate labels that are biased against people of the given race. In some cases, results of a workflow that use a machine-learning model may influence or define how a given entity interacts with prospective customers, and a bias may negatively affect the entity's sales.

Historically, many entities chose to partner with other entities to construct and use machine-learning models. However, this technology is becoming more prevalent, and entities are trending towards coordinating use of the models independently. Thus, it is important that entities that control and operate protocols that use machine-learning models understand whether a bias is being introduced and to understand how to mitigate any such bias.

SUMMARY

Certain aspects and features of the present disclosure relate to a computer-implemented method for enabling the detection of and mitigation of biasing of computation workflows. Multiple class attributes are detected using the sets of user data. One, more, or all of the multiple class attributes may be a protected class attribute in a given context or generally. For example, the multiple class attributes may be characteristics of people for which one or more laws in a jurisdiction prohibit bias when processing loan requests.

For each class attribute of the multiple class attributes, at least one of the sets of user data includes the class attribute. For each class attribute of the multiple class attributes, one or more bias metrics are determined that estimate a degree to which the particular workflow is biased in association with the (e.g., protected) class attribute. The particular workflow can be configured to transform an input data set via a set of processing stages. Each user of the set of users can be associated with a set of user data of the multiple sets of user data that is to be processed by the particular workflow. At least one of the set of processing stages can include executing a machine-learning model.

It is detected that a bias-mitigation option has been selected, where the selected bias-mitigation option corresponds to a specific class attribute of the multiple class attributes. For each processing stage of at least one or at least two of the set of processing stages: a de-biasing technique is selected, and the processing stage is modified by applying the selected de-biasing technique to the processing stage. A modified version of the particular workflow is applied to each of a set of input data sets. The modified version of the particular workflow includes the modified processing stages.

In some instances, the method further includes receiving an identification of a particular workflow from a client device. A definition of a set of users may further or alternatively received from the client device. Each user of the set of users is associated with a set of user data that is to be processed by the particular workflow.

In various embodiments, a computer-program product is provided that is tangibly embodied in a non-transitory machine-readable storage medium. The computer-program product can include instructions configured to cause one or more data processors to perform part or all of a method disclosed herein.

In various embodiments, a system is provided. The system can include one or more data processors and a non-transitory computer readable storage medium containing instructions which, when executed on the one or more data processors, cause the one or more data processors to perform part or all of a method disclosed herein.

The following detailed description together with the accompanying drawings will provide a better understanding of the nature and advantages of the present disclosure.

BRIEF DESCRIPTION OF THE DRAWINGS

Illustrative embodiments of the present invention are described in detail below with reference to the following drawing figures:

FIGS. 3A-3B depict exemplary interfaces for selecting attributes for which to initiate or update de-biasing protocols.

FIGS. 12A-B shows exemplary results that can guide user-controlled and/or automated de-biasing actions.

Figure 1:
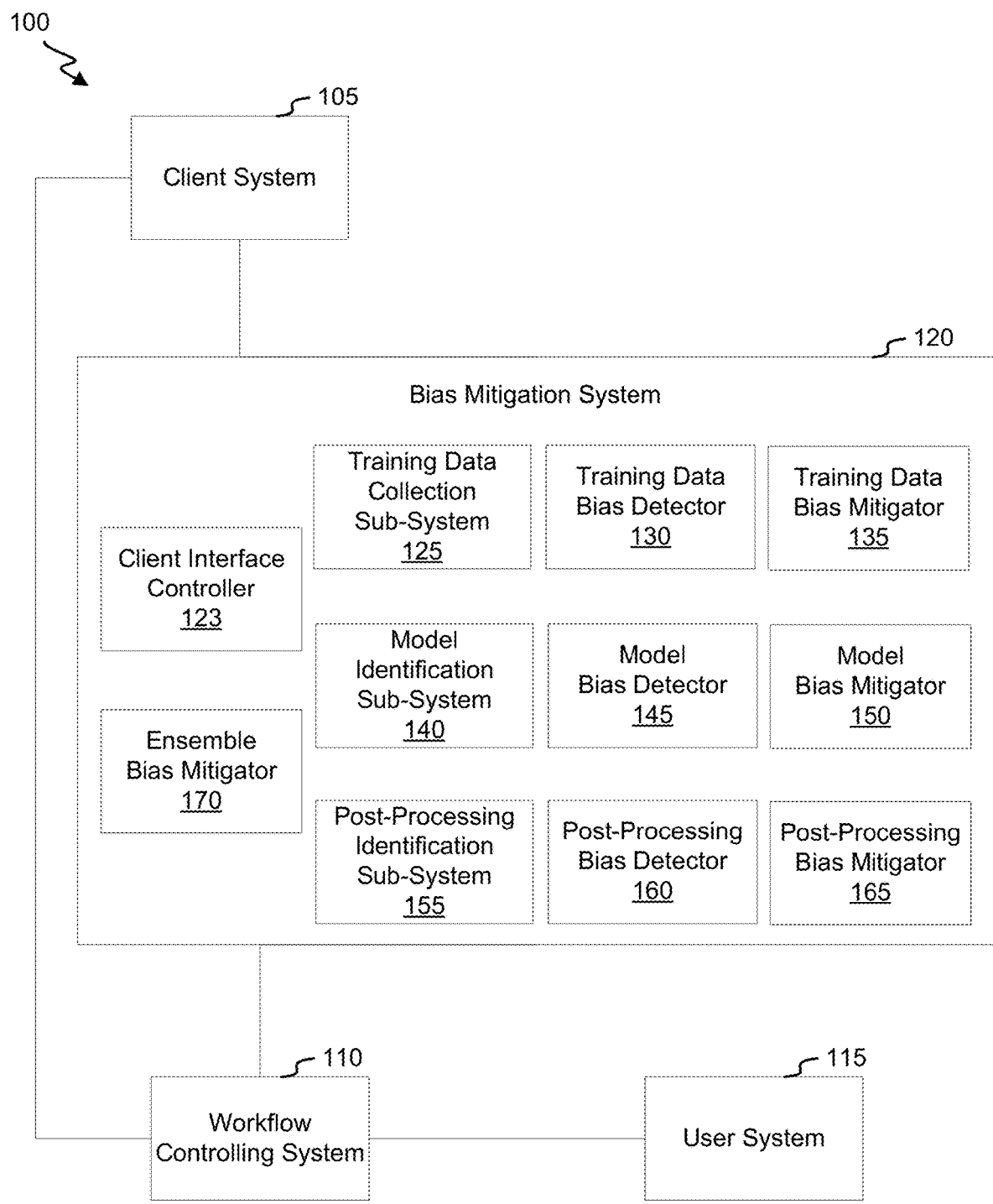
FIG. 1 shows an example network for facilitating the de-biasing of computational workflows in accordance with some embodiments of the invention.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Overview

Frequently, machine-learning models are trained by subdividing an initial training data set into multiple subsets. A first subset is used to train the machine-learning model. A second subset may be used during training to validate the trained machine-learning model by characterizing a quality of the training and/or of a performance of the machine-learning model. Sometimes, an initial data set may be repeatedly divided into different fractions for repeated training and validation. A third subset may be used as a hold-out testing data set so as to independently characterize a performance of the machine-learning model.

However, if the initial training data set, variable definitions, and/or variable dependencies are sub-optimally defined, results may be inaccurate—even if they were deemed to have been accurate during training. That said, accuracy is a metric that is very frequently at the core of the development of and assessment of models. However, accuracy is not the only metric that characterizes how "well" a model is performing.

As machine-learning models are becoming increasingly used and increasingly complex, it is becoming more important that other types of metrics be tracked. For example, results from a machine-learning model may now be used to influence: which type of recommendation (e.g., or an action, product, or service) that is provided, a discount that is offered, and/or a messaging that is communicated. Beyond determining whether such a consequence is deemed to be "accurate" (in accordance with whatever definition an operator set for accuracy), if these outputs are not generated in an unbiased and fair manner, the source entity may suffer severe reputational, economical, and legal consequences.

However, monitoring the fairness of a workflow is difficult, especially given the unpredictability in the distributions of input data and the fact that the interpretability of many machine-learning models is beginning to substantially decrease.

In some embodiments, techniques disclosed herein facilitate detecting biases within a workflow and further facilitate mitigating the bias. The workflow may involve multiple stages, which can include: a pre-processing stage during which a training data set is identified for training a machine-learning model; an in-process stage during which the machine-learning model is trained; and a post-processing stage during which an output from the machine-learning model is transformed into a result that triggers an action and/or that is presented to a user for further decision-making More specifically, a workflow may be defined based on one or more client inputs. For example, a client may select, upload, or otherwise identify a machine-learning model and/or one or more other processing techniques to be performed. The client may further specify a definition of a set of users (e.g., a campaign segment) for which the workflow is to apply. The definition may identify (for example) one or more user attributes, one or more previously recorded user actions, and/or one or more statistics generated based on a user's account. A workflow may include executing the machine-learning model and any pre- or post-processing associated with the machine-learning model.

A bias mitigation system may then detect an extent to which various stages within the workflow are biased. More specifically, a global set of class attributes (e.g., protected class attributes) can be defined ab initio. For each specific model and/or model implementation, the model and/or implementation may be evaluated against one, more, or all of the global set of class attributes (e.g., at the same time). The bias mitigation system may detect an extent to which each stage within the workflow is biased with respect to the defined set of users. For example, the bias mitigation system may determine one or more bias metrics that characterize an extent to which each stage within the workflow is biased with respect to a protected class (e.g., gender, race, religion, age, national origin, pregnancy status, familial status, disability status, or veteran status).

The bias metrics may be used to determine whether a bias-mitigation condition is satisfied. In some instances, the bias mitigation system may present the metric(s) in association with an identification of the corresponding set of user(s). A set of users may include (for example) an underprivileged set of users for which a policy, regulation, or law aims to prevent bias due to (for example) historical bias impacting similar users. A client may then provide an input (e.g., may select a bias-mitigation option) that requests that a bias mitigation be performed with respect to a particular set of users. For example, selection of a bias-mitigation option may include setting a toggle switch, selecting a list item in a drop-down menu, etc. that corresponds to a request to perform bias mitigation. When the bias-mitigation option is presented in an interface, it may be visually associated with (e.g., aligned with, next to, etc.) an identification of a specific class attribute. Alternatively or additionally, the bias mitigation system may automatically determine that a bias metric exceeds a predefined threshold and thus determine that the bias-mitigation condition was satisfied.

The predefined threshold may be defined based on input received from the client that indicates—for each of one or more class attributes—whether and/or an extent to which bias is acceptable. For example, a client may believe that a particular service that is offered is of interest only to older users and not to younger users. Thus, the client may indicate that any bias towards older users for offering a discount or specific type of messaging in association with the particular service is acceptable. Accordingly, the predefined threshold may be set to override or not applicable.

Upon determining that a bias-mitigation condition is satisfied, a de-biasing algorithm may be selected for use for each of one, more, or all stages in the workflow. In some instances, each of one, more or all stages in the workflow is associated with multiple de-biasing algorithms. Thus, the bias mitigation system may estimate the extent to which each de-biasing algorithm reduces the bias at each stage.

For each stage, the selected de-biasing algorithm may be used to de-bias the stage. It will be appreciated that, as used herein, "de-biasing" refers to an attempt to reduce or eliminate a bias. However, a de-biasing algorithm, technique, or protocol need not necessarily fully eliminate a bias in a current or future data set.

It will also be appreciated that the de-biasing of various processing stages need not occur concurrently. For example, a pre-processing stage may be de-biased by analyzing a training data set. Subsequently, a client may select, upload, or identify a machine-learning model and/or one or more other processing specifics. Then an in-processing and/or post-processing stage may be examined in terms of current bias and potential bias mitigation.

The de-biasing may be performed in a manner that balances fairness with accuracy. For example, a client may provide input that identifies a minimum accuracy threshold, a minimum fairness threshold, and/or a degree to which fairness is to be prioritized relative to accuracy. Thus, even if one de-biasing algorithm achieves higher fairness relative to another de-biasing algorithm, if it cannot meet an accuracy constraint, the other de-biasing algorithm may be selected. In some instances, a de-biasing algorithm is first independently selected for each of one or more processing stages in a workflow. In some instances, de-biasing algorithms are concurrently selected for multiple processing stages in a workflow based on overall accuracy and/or fairness metrics. A manual override option may also allow a client to indicate that the workflow is to be optimized only for fairness and not accuracy (or the reverse) or may identify a relative priority of optimizing for fairness as compared to accuracy.

In some instances, there are correlations between particular user attributes. Thus, a fairness deficit associated with one type of user attribute may be a result of or redundant with a fairness deficit associated with another type of user attribute. Attempting to de-bias each of or one of the types of user attributes without considering the other may be disadvantageous. Accordingly, in some instances, upon identifying a correlation between types of user attributes in terms of fairness, it may be determined which of the types of user attributes is associated with a larger fairness deficit. The type of user attribute associated with the larger fairness deficit may then be discarded and not used for any subsequent de-biasing. In some instances, upon identifying a correlation between types of user attributes in terms of fairness, it may be determined that a workflow or machine-learning model is to be modified to no long depend on one of the user attributes that are correlated with each other, where the one of the user attributes includes a protected user attributes (e.g., for which a policy, regulation, statute, etc. indicates that bias or that bias of a given threshold extent is impermissible or is consequential).

Exemplary Network

FIG. 1 shows an example network 100 for facilitating the de-biasing of computational workflows in accordance with some embodiments of the invention. A client system 105 sends a request to a workflow controlling system 110 to identify one or more user systems 115, to identify specific content to be provided to each user system 115 using a particular workflow, and to provide the specific content to the workflow. Client system 105 may indicate that the specific content is to be identified at least in part using a result from a machine-learning model generated based on input data associated with user system 115. The specific content may include (for example) a recommended product or service, a discount, a price, a promotion, a proposed computational resource, etc. The particular workflow may further include a pre-processing stage for training the machine-learning model using a training data set, which may have been identified by client system 105 or otherwise defined. The particular workflow may further include a post-processing stage to convert an output from the machine-learning model to a result that is provided to client system 105 or that initiates an action. The machine-learning model may include (for example) a supervised learning algorithm, a classifier (e.g., a Naive Bayes, decision-tree, or k-nearest neighbor classifier), or a regression algorithm (e.g., a linear regression, logistic regression, or support vector machine).

Network 100 includes a bias mitigation system 120 configured to determine an extent to which part or all of the workflow is biased again a user sub-population (e.g., a historically under-privileged user sub-population) and/or to mitigate such a bias. The user sub-population can correspond to users associated with one or more specific user class attributes. The one or more specific user class attributes may have been specified by client system 105 and/or predefined.

Bias mitigation system 120 includes a client interface controller 123 that controls which interfaces are presented to clients and how user interactions with the interfaces are recorded. The interfaces may include (for example) a form, question, option, image, pull-down, menu, file-upload component, etc. that allows a client to select a given model that is to be used in a workflow, a target population for a campaign and/or a training data set. The interface may further present preliminary and/or final results of a bias mitigation and/or may include a component to receive input indicating whether a preliminary bias mitigation is to be implemented.

For example, an interface may present a fairness metric and/or an accuracy metric associated with a candidate output of the particular workflow and may further present (e.g., concurrently or on a separate screen) fairness metric and/or an accuracy metric associated with a candidate output of a modified version of the particular workflow (generated via the preliminary bias mitigation). The candidate output may correspond to (for example) a decision as to whether to send a particular type of communication (e.g., an advertisement or offer), when to send a particular type of communication and/or what type of communication to send. A fairness metric may indicate the extent to which the decision is uneven across different sub-populations associated with a class metric. In some instances, a fairness metric may include a single metric that indicates the extent to which a decision is fairly applied across different sub-populations. In some instances, a fairness metric may pertain to an individual sub-population. For example, if an initial workflow was more likely to present offers to men than women, a fairness metric may estimate a probability that women would receive offers, a relative probability that women would receive offers as compared to men, or a relative probability that women would receive offers when the modified workflow would be used as compared to the probability when an unmodified workflow would be used.

An accuracy metric may indicate the extent to which subsequent user actions matched predictions that underpinned the decision or the extent to which a target result was achieved (e.g., the percentage of users who received various types of content who clicked on a link and/or who made a purchase through an associated web site). The accuracy metric may pertain across sub-populations (e.g., may include a consistency across sub-populations) or may pertain to a specific sub-population. For example, suppose that each of an initial workflow and a modified workflow identified users to receive a communication with Offer #1 versus Offer #2. It may be predicted—for each workflow—a percentage of men, a percentage of women, and a percentage of men and women who would click on a link to a corresponding web site, and the percentage(s) may further or alternatively be calculated for individual subsets of the men, women, and both, where the subsets differ based on which offer is to be provided. An accuracy metric may use or include one or more of these percentages. For example, an accuracy metric may predict (across all users and both offers) a percentage of users who would click on the link, a percentage of users who would click on the link if the modified workflow was used relative to if the initial workflow was used, etc.

An accuracy metric may correspond to how accurately a workflow is predicted to generate outputs that achieve high (or that optimize) a reach of content (e.g., corresponding to a number or portion of a population for which the content was presented at corresponding user devices). For example, if emails are sent to 100 email addresses, the reach may indicate a portion of the email addresses for which the email was opened and/or at least a particular part of the content was presented). An accuracy metric may also or alternatively correspond to how accurately a workflow is predicted to generate outputs that achieve high (or that optimizes) engagement (e.g., corresponding to a user interacting with and/or responding to content in a particular manner, such as by clicking on a link or requesting information). An accuracy metric may also or alternatively correspond to how accurately a workflow is predicted to generate outputs that achieve high (or that optimizes) conversion (e.g., corresponding to a purchase).

The interface may include an input component configured to receive one or more inputs that indicate whether the preliminary bias mitigation is accepted (e.g., so as to trigger a corresponding modification in the particular workflow). In some instances, an input component may be configured to adjust a target fairness metric, and updated statistics (e.g., showing predicted accuracy) may be shown in real-time.

A training data collection sub-system 125 collects a training data set that is to be used within the workflow to train the machine-learning model. The training data set may have been received from client system 105 and/or defined based on one or more constraints received from or associated with client system 105. For example, a training data set may include user and purchase data associated with a client's account over the past year.

A training data bias detector 130 determines an extent to which there is a bias in the training data set with respect to each of one or more user class attributes. The one or more user class attributes may have been specified by client system 105 and/or predefined. For example, the one or more user class attributes may include attributes of protected classes including: gender, race, religion, age, national origin, pregnancy status, familial status, disability status, or veteran status. Training data bias detector 130 may determine whether there is a bias for a given type of class attribute based on whether data corresponding to the class attribute is relatively underrepresented in the training data and/or whether data within the training data set that corresponds to the class attribute is more likely to be associated with one potential label (e.g., non-purchase, fraud alert, denial) that are data not associated with the class attribute.

It will be appreciated that, in some instances, a client may be aware that a bias potentially exists and may have determined that a given bias (or up to a given extent of bias) is acceptable for a given circumstance. For example, market research data may have indicated that women are more likely to be interested in a particular offered service than men, and thus, a training data set that includes more data elements corresponding to female users relative to male users may be acceptable. Thus, training data bias detector 130 may identify, for each of one or more class attributes, whether and/or a degree to which client system 105 has indicated a specific degree of non-uniformity that is acceptable in association with the class attribute as it pertains to the particular workflow. For example, a client-identified heuristic may indicate that the client accepts a training data set for which women are represented up to three times as much as men. The client-identified heuristic may also indicate correlations between class attributes that are acceptable.

A training data bias mitigator 135 at least partly mitigates any unacceptable detected bias in the training data. For example, a statistic of the training data (e.g., that indicates a portion of the training data that corresponds to a given class attribute and/or to both a given class attribute and a given label) can be compared a fixed threshold, a comparable statistic of the training data that relates to one or more other attributes for the same class, and/or a comparable statistic from another data set (e.g., a public data set) that relates to the class attribute. The comparison (or other analysis) may indicate whether there is an unacceptable bias in the training data. The mitigation can include under- or over-sampling a portion of the training data, automatically retrieving training data of a particular type, or sending a request to client device 105 to collect additional training data of a particular type.

Bias mitigation system 120 includes a model identification sub-system 140 that identifies a type of machine-learning model to be used in the workflow. The machine-learning model may have been uploaded by client system 105 and/or defined based on input from client system 140.

A model bias detector 145 detects an extent to which the machine-learning model is biased towards or against the class attribute. For example, synthetic data may be used to assess whether there is any such bias. The synthetic data may include input data that spans an input space and includes multiple different class attribute values for a given class attribute (e.g., and multiple different class attribute attributes for one or more other class attributes). An analysis of results produced by the model using the synthetic data may then be used to determine whether and/or an extent to which the machine-learning model is biased towards or against a value of the class attribute. The analysis may include determining whether and/or how the class attribute is predictive of the model's results.

Model bias detector 145 may further use a client-identified heuristic to determine whether any detected bias is acceptable to the client. For example, previous focus groups may have indicated that younger users are more likely to accept offers that indicate that purchasing one product (e.g., a plane ticket) will result in a discount in a streaming service. The client may then determine that it is acceptable for the machine-learning model to be biased towards users under 30 years old, so long as at least 30% of offer recommendations are associated with users over 30 years old.

A model bias mitigator 150 at least partly mitigates any detected bias in the model (e.g., that the client identified as being unacceptable). The bias may be mitigated by (for example) adjusting a weight associated with one or more non-protected attributes, where each non-protected attribute corresponds to a user attribute or feature different than a class that is being assessed for bias and/or different than a protected class. By mitigating the model bias in this manner, it is more likely that the bias-mitigated model will perform more consistently even when or if a representation of users with a class attribute being assessed for bias changes.

Model bias mitigator 150 may mitigate a bias in a manner that only optimizes fairness or in a manner in which both fairness and accuracy are considered. For example, an optimization function (e.g., defined by client system 105) may weight fairness relative to accuracy. As another example, a minimum acceptable level for fairness may be defined and accuracy may otherwise be optimized (or the reverse). As yet another example, a manual override may be received from a client that identifies that only fairness (or only accuracy) is to be optimized or that identifies a particular degree to which fairness is to be optimized relative to accuracy.

A post-processing identification sub-system 155 identifies one or more types of post-processing to be used in the workflow. For example, the post-processing may include thresholding, mapping, or normalizing an output from the machine-learning model.

A post-processing bias detector 160 detects an extent to which the post-processing technique(s) is biased towards or against the class attribute. Synthetic data and/or statistics may be used to assess whether there is any such bias. As before, one or more heuristics from the client may indicate—for a given class attribute—whether and/or an extent to which bias is acceptable.

A post-processing bias mitigator 165 at least partly mitigates any detected bias in the post-processing (e.g., that was unacceptable to the client). The bias may be mitigated by (for example) adjusting one or more fixed variables, one or more relationships, and/or one or more conditions. In some instances, post-processing bias mitigator 165 mitigates a post-processing bias in a manner that is not specifically tied to a class attribute for which a bias was detected.

Post-processing bias mitigator 165 may mitigate a bias in a manner that only optimizes fairness or in a manner in which both fairness and accuracy are considered. For example, an optimization function (e.g., defined by client system 105) may weight fairness relative to accuracy. As another example, a minimum acceptable level for fairness may be defined and accuracy may otherwise be optimized (or the reverse).

Bias mitigation system 120 includes an ensemble bias mitigator 170 that defines a final workflow. The final workflow may include one or more original processing stages of the workflow and/or one or more de-biased stages of the workflow. In some instances, the de-biasing performed at bias mitigation system 120 and/or rules used by ensemble bias mitigator 170 indicate that if a given de-biased processing stage is to be included in a workflow, for each processing stage that is subsequent to the given de-biased processing stage in the workflow, a de-biased version of the processing stage is to be included in lieu of an original version. In some instances, ensemble bias mitigator 170 independently assesses whether an original or de-biased version of each processing stage is to be included in the workflow based on a predefined criterion (e.g., that prioritizes a change in fairness relative to a change in accuracy). It will be appreciated that a processing stage that is included in the workflow may even include a version of the processing stage that has been de-biased using multiple de-biasing techniques and/or using multiple de-biasing algorithms.

In some instances, ensemble bias mitigator 170 facilitates coordinated bias mitigation between two or more of training data bias mitigator 135, model bias mitigator 150, and post-processing mitigator 165. The coordination may be particularly advantageous when a client has identified a heuristic that indicates up to a particular amount of bias is acceptable. Without such coordination, independently characterizing and mitigating bias during each of the processing stages in view of the particular amount of bias may result in a total workflow-level of bias that exceeds the acceptable amount.

Upon identifying a final workflow, bias mitigation system 120 avails the workflow to workflow controlling system 110, which can then use the workflow to process stored or newly received user data sets. In some instances, bias mitigation system 120 repeatedly or regularly evaluates the workflow for bias and performs de-biasing measures. In some instances, client system 105 repeatedly triggers such repeated evaluations and/or de-biasing (e.g., based on the same or different specifications of user attributes).

It will be appreciated that one or more components of bias mitigation system 120 (e.g., training data bias detector 130, model bias detector 145, and/or post-processing bias detector 160) may store information that identifies whether a bias was detected, a type of bias that was detected, and/or a magnitude of bias that was detected (e.g., at a given time and/or in a given context). The information may be stored with (for example) information about a corresponding time and/or context (e.g., an identifier of a training data set, an identifier of a model, and/or an identifier of one or more post-processing algorithms). Additionally or alternatively, one or more components of bias mitigation system 120 (e.g., training data bias mitigator 135, model bias mitigator, post-processing bias mitigator 165 and/or ensemble bias mitigator 170) can identify a type of mitigation that was used, one or more parameters of a mitigation, and/or a result (e.g., in terms of fairness, accuracy and/or bias) of applying the mitigation. The information may again be stored in association with a corresponding time and/or context. A component of bias mitigation system (e.g., ensemble bias mitigator or another component) ma further save a de-biased model and/or debiased segment data. Any of this information may later be used to address the extent to which bias is changing over time and/or mitigation is changing over time (e.g., in terms of mitigation techniques and/or efficacy).

Exemplary Interfaces for Facilitating Balancing Accuracy and Fairness

FIGS. 2A-2D depict exemplary interfaces that may be used to define thresholds to be used for de-biasing computational workflows. As explained above, training a machine-learning model and configuring a workflow to maximize accuracy of predictions may result in biases. Conversely though, training a machine-learning and configuring a workflow to maximize fairness may result in poor and inaccurate predictions. Thus, techniques disclosed herein facilitate defining a workflow in a manner that balances accuracy and fairness. This balance may be achieved by (for example) using a loss function or fitting technique that prioritizes a weighted average of accuracy and fairness, or by first configuring a workflow using one type of optimization (e.g., for accuracy) and then modifying the workflow in view of the other variable (e.g., fairness).

Inputs from a client system may be used to determine how to prioritize accuracy relative to fairness. For example, for a given type of class attribute (e.g., gender, race, etc.), a client may identify a minimum acceptable accuracy and/or a minimum acceptable fairness. In some instances, the client may indicate that a particular minimum acceptable accuracy and/or minimum acceptable fairness applies to multiple or all types of class attributes.

Selecting these minimum thresholds may be non-intuitive and challenging to a client without understanding how accuracy relates to fairness for a given use case. For example, if a client understood that changing a minimum acceptable accuracy from 95% to 85% would result in a five-fold improvement to fairness (e.g., from 10% to 50%), this may be an acceptable trade-off off, where it may be unacceptable if it only increased the fairness by 5% (e.g., from 10% to 10.5%).

Accordingly, in some embodiments, an interface predicts how relative prioritizations of accuracy versus fairness affects each of the two variables. These predictions may be generated by (for example) defining one or more modified processing stages for a workflow and characterizing the accuracy and/or fairness of results generated for a training, validation, or hold-out data set.

Figure 2A:
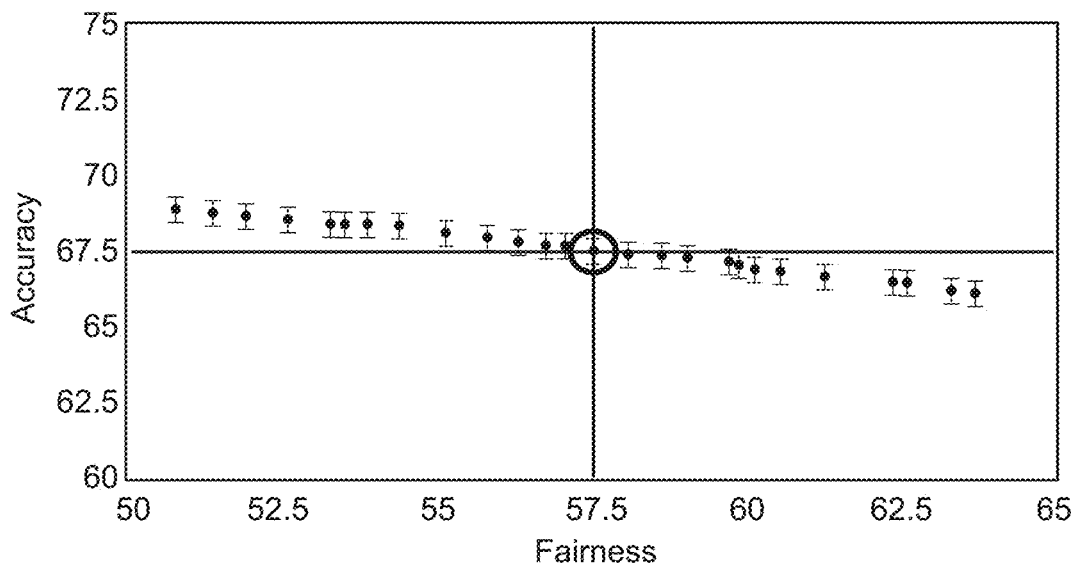
FIGS. 2A-2D depict exemplary interfaces that may be used to define thresholds to be used for de-biasing computational workflows.
Figure 2B:
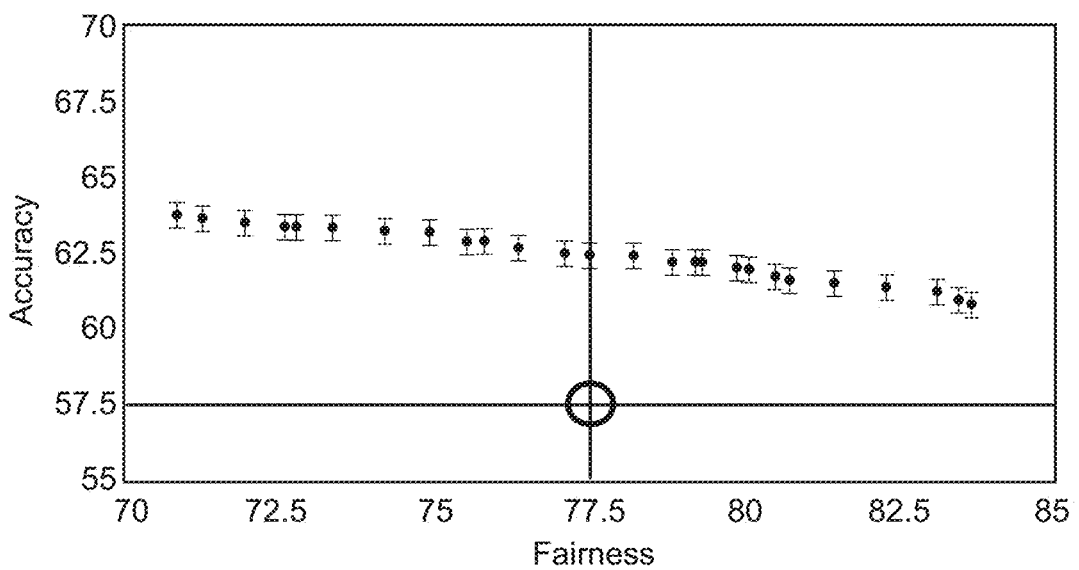
Figure 2C:
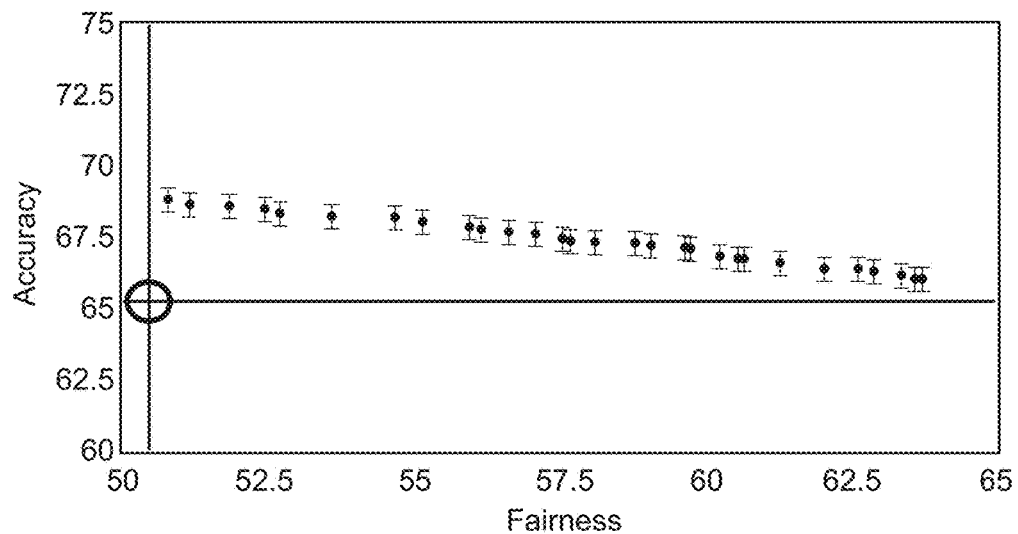

Each of FIGS. 2A-2C corresponds to a same specific type of class attribute and shows the same data points. Each data point corresponds to a different relative prioritization of accuracy versus fairness. The plot then shows the accuracy and fairness metrics corresponding to the relative prioritization.

A client can then interact with the graph to select minimum thresholds for accuracy and fairness. In the depicted instances, the thresholds can be defined using a cross-hair input component, though other types of input components (e.g., one or more text boxes, slider bars, or drop-down menus) may alternatively be used.

In FIG. 2A, the client has selected an accuracy threshold of 67.6% and a fairness threshold of 57.5%. As compared to an approach that only prioritizes accuracy, these thresholds resulted in 1.5% decrease in accuracy but a 7.5% increase in fairness.

In FIG. 2B, the client selected the same fairness threshold of 62.7% but an accuracy threshold of 57.5%. In FIG. 2C, the client selected an accuracy threshold of 65% and a fairness threshold of 50.5%. Notably, unlike the situation in FIG. 2A, the pairs of thresholds selected in FIG. 2B and in FIG. 2C do not line up with any given data point in the graph. In these cases, multiple data points are to the top and right of the cross-hairs, indicating that each of the multiple data points satisfies the threshold constraints. Thus, a default rule (e.g., that prioritizes fairness over accuracy so long as client-defined constraints are met) may be used to determine how to prioritize accuracy versus fairness to select between relative prioritizations associated with the multiple data points.

Figure 2D:
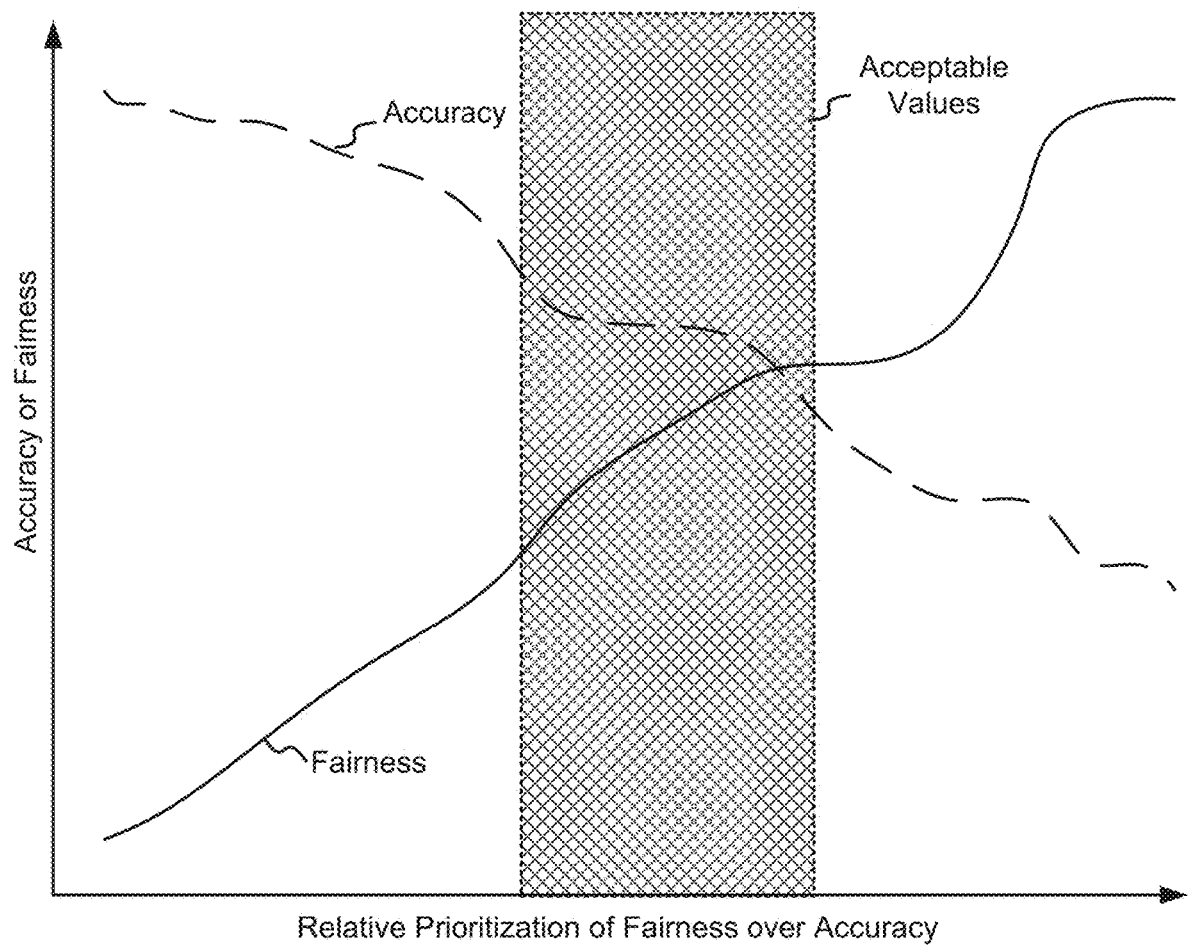

The graph in FIG. 2D differs from those in FIGS. 2A-2C, in that it explicitly relates accuracy and fairness to a relative prioritization of fairness over accuracy, and smooth functions are shown instead of data points. For example, for a given type of class attribute, fairness and accuracy metrics may still be determined for each of multiple relative prioritization. However, in this circumstance, a first function may be fit to data points relating fairness metrics to the relative prioritization, and a second function may be fit to data points relating accuracy metrics to the relative prioritization. A client may then use a box tool or vertical slider to select a region or x-position of the graph that corresponds to relative prioritizations associated with acceptable accuracy and fairness metrics. In the depicted case, the selected region corresponds to multiple relative prioritizations. Thus, a default rule may be used to select a specific relative prioritization from with the range of acceptable values.

It will be appreciated that metrics associated with a type of class attribute may change in time as new input data is received. For example, while a workflow may have a given accuracy and fairness with respect to one type of class attribute as determined using training or hold-out data, the workflow may have a different accuracy or fairness after the workflow is used in a live circumstances and receives new data. Thus, de-biasing protocols may be employed before a workflow is used or in real-time as the workflow is being used. De-biasing protocols may be configured as part of a workflow for each training job for a given model or can be triggered on demand during a production lifecycle of a machine-learning project.

In some instances, a de-biasing algorithm is performed automatically upon detecting a bias or a bias that surpasses a level identified by a client as acceptable. In some instances, detection of a bias or a bias that surpasses a level identified by a client as acceptable triggers a communication to be sent to the client that identifies the bias. For example, an email may be sent to a client that includes a link to an interface depicted in FIG. 3A or 3B.

FIG. 3A shows each of eight different types of class attributes. For each type of class attribute, the interface identifies a heuristic level previously identified by the client, which indicates an acceptable lower bound on fairness for a given workflow circumstance. The interface also identifies an updated fairness metric based on recent performance of the workflow. The interface may be configured to accept a new definition of the heuristic and/or an instruction to initiate a de-biasing protocol (e.g., using an original or updated heuristic).

FIG. 3B shows information pertaining to a single type of class attribute (veteran status). The interface shows heuristics that identify lower bounds for accuracy and fairness previously identified by the client as being acceptable and also statistics characterizing recently observed accuracy and fairness of the model. The client may update either heuristic in the interface and/or initiate a de-biasing protocol.

Exemplary Processes for Detecting and Mitigating Biases

Figure 4:
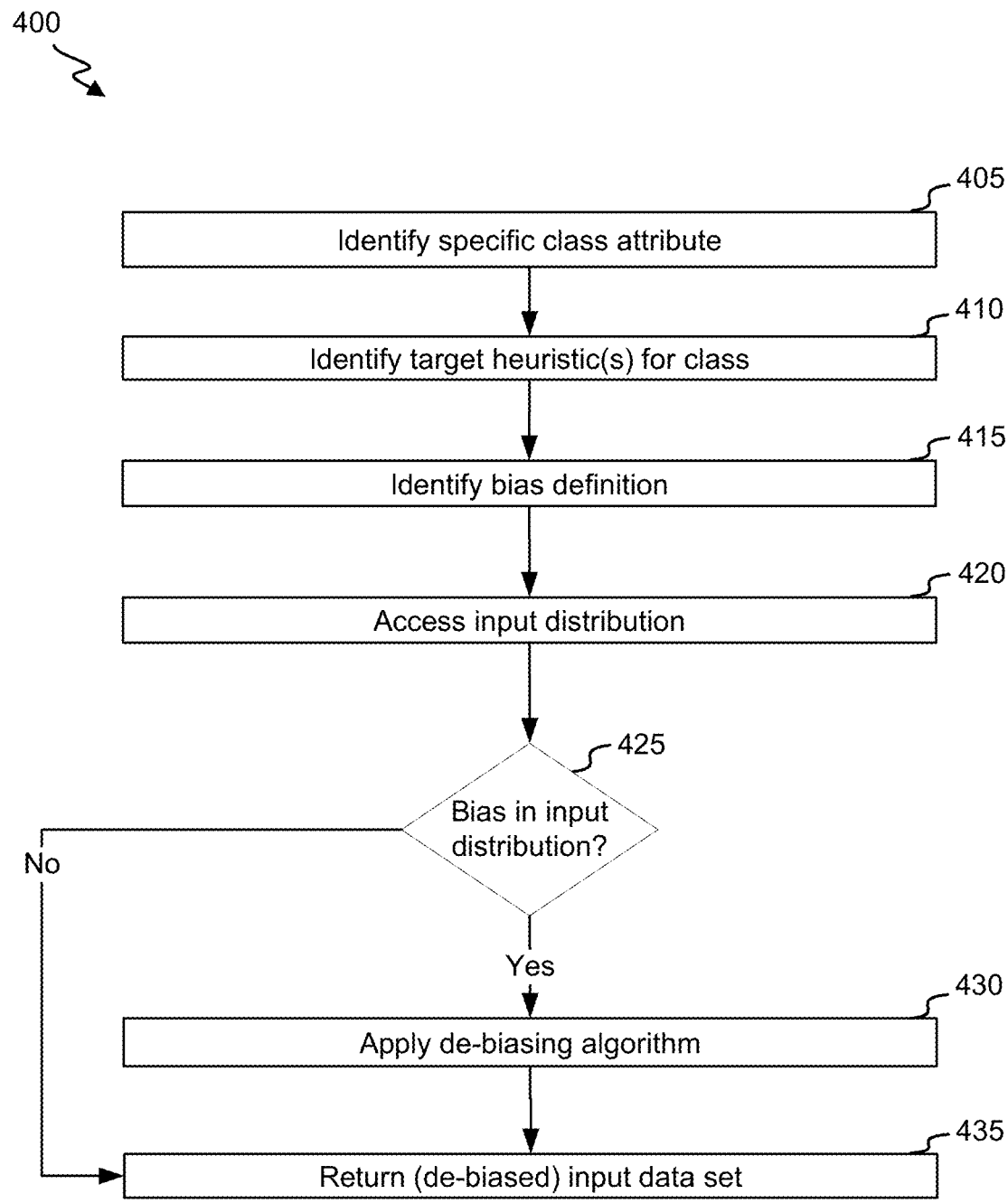
FIG. 4 illustrates an exemplary process for detecting and responding to a bias in an input distribution.

FIG. 4 illustrates an exemplary process 400 for detecting and responding to a bias in an input distribution. The input distribution may include inputs in a training data set or non-training input data received when a workflow is deployed.

Process 400 begins at block 405 where a specific class attribute is identified. The specific class attribute may have been selected by a client and/or may correspond to a protected class for which one or more regulations apply. For example, a specific class attribute may include gender, race, religion, age, national origin, pregnancy status, familial status, disability status, or veteran status.

At block 410, one or more target heuristics is identified for the specific class attribute. The target heuristic may include for, example, a minimum acceptable fairness and/or a minimum acceptable accuracy. The target heuristic(s) may have been provided by a client system.

At block 415, a bias definition is identified as it pertains to input data. The bias definition may, for example, relate to a distribution for the specific class attribute to a uniform distribution or a distribution from a baseline population (e.g., population in a given country). The bias definition may account for noise and may utilize any target heuristic that applies to fairness. As one example, for gender, it may be assumed that a baseline distribution is 50% male and 50% female, though noise, imperfect availability of information, and a size of a data set may indicate that having at least 40% of either males or females in a input data set is acceptable. The bias definition can then indicate that bias is indicated when fewer than 40% of the input data corresponds to males or fewer than 40% of the training data corresponds to females.

As another example, a heuristic from a client may indicate that the client has indicated that it is acceptable if as little of 10% of the input data corresponds to males. The bias definition may then maintain the 40% threshold for females but indicate that bias is indicated when fewer than 10% of the input data corresponds to males. The heuristic may include a threshold for a representation statistic, for a disparate impact metric, or for a group fairness metric.

In some instances, the bias definition includes a threshold or range for each of one or more bias-characterizing statistics. For example, the bias definition may identify an acceptable range for statistical parity difference (e.g., between –0.1 and 0.1), for disparate impact (e.g., between 0.8 and 1.25) and/or for equal opportunity difference (e.g., between 0.6 and 1.0).

At block 420, an input distribution is accessed. The input distribution may identify, for each potential value of the specific class attribute, a portion of an input data set that has the value. For example, the input distribution may identify what fraction of records in an input data set include an indication that a corresponding user was a particular race.

At block 425, the input distribution and bias definition are analyzed to determine whether there is a bias (e.g., determined to be unacceptable to the client) in the input distribution in association with the specific class attribute. If so, process 400 proceeds to block 430, where a de-biasing algorithm is applied. The de-biasing algorithm may (for example) include under- or over-sampling a portion of the input data set; modifying weights of particular data elements in the input data set; editing feature values to reduce disparate impact corresponding to the specific class; modifying training data features and labels; learning fair representations by obfuscating select information about the class attribute; a reweighing algorithm; a Learning Fair Representation algorithm; a Disparate Impact Remover algorithm; and/or an Optimized Pre-Processing algorithm. In some instances, one or more metrics (e.g., of fairness) are determined both before and after the de-biasing and can be availed to the client system or stored.

In some instances, after applying the de-biasing algorithm, process 400 returns to block 420 (not shown) to initiate a re-evaluation of whether and/or an extent to which there is a bias in the input distribution. In some instances, the process repeats until any bias is of an acceptable size, at which point process 400 can proceed to block 435.

In the depicted instance, upon completion of block 430, process 400 proceeds to block 435, where the de-biased input data set is stored and returned (e.g., to be used for training and/or to be processed). Similarly, when it is determined at block 425 that the input distribution is not biased, process 400 proceeds to block 435 where the original input data set is returned (e.g., to be used for training and/or to be processed).

Figure 5:
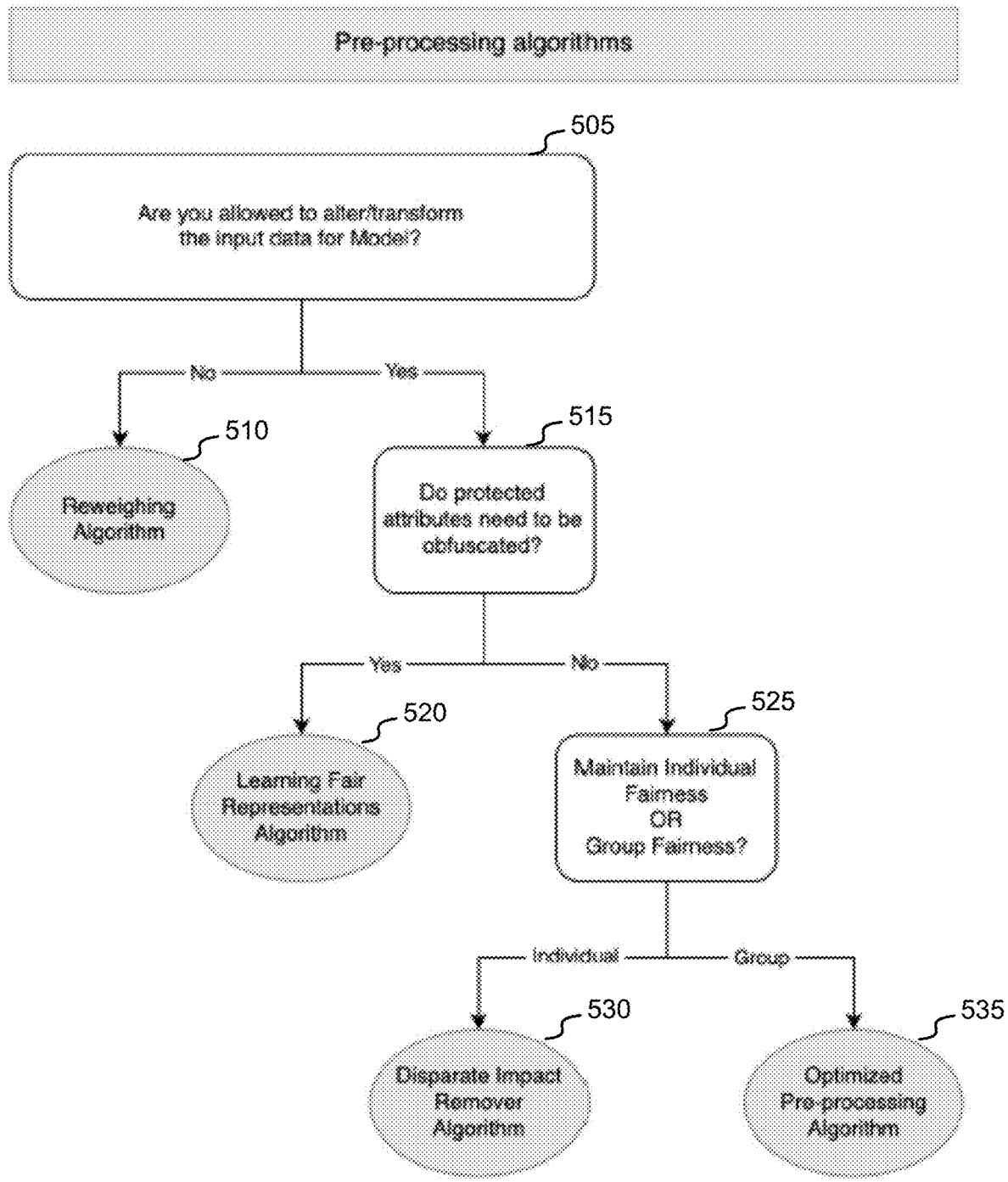
FIG. 5 depicts an exemplary process for selecting an algorithm to facilitate de-biasing an input distribution.

FIG. 5 depicts an exemplary process for selecting an algorithm to facilitate de-biasing an input distribution. At block 505, it is determined whether an input data set can be modified for use in particular workflow. If not, at block 510, a reweighing algorithm is applied at block 510, where data elements that include underrepresented class attributes are more heavily weighted than other data elements.

If the input data set can be modified, at block 515, it is determined whether a protected class attribute is to be or needs to be obfuscated (e.g., to comply with a data-use restriction, a regulation, or a law). If so, at block 520, a Learning Fair Representations algorithm is applied, such as an algorithm including one or more characteristics as described in Rich Zemel, Yu Wu, Kevin Swersky, Toni Pitassi, Cynthia Dwork. "Learning Fair Representations" *Proceedings of the* 30*th International Conference on Machine Learning, PMLR* 28(3):325-333, 2013, which is hereby incorporated by reference in its entirety for all purposes.

If the class attributes are not to be or need not be obfuscated, at block 525, it is determined whether to facilitate individual fairness or group fairness. If individual fairness is to be facilitated, at block 530, a Disparate Impact Remover algorithm is applied, such as an algorithm including one or more characteristics as described in M. Feldman, S. A. Friedler, J. Moeller, C. Scheidegger, and S. Venkatasubramanian, "Certifying and removing disparate impact." *ACM SIGKDD International Conference on Knowledge Discovery and Data Mining,* 2015, which is hereby incorporated by reference in its entirety for all purposes. If group fairness is to be facilitated, at block 535, an Optimized Pre-Processing algorithm is applied, such as an algorithm including one or more characteristics as described in F. P. Calmon, D. Wei, B. Vinzamuri, K. Natesan Ramamurthy, and K. R. Varshney. "Optimized Pre-Processing for Discrimination Prevention." *Conference on Neural Information Processing Systems,* 2017, which is hereby incorporated by reference in its entirety for all purposes.

Figure 6:
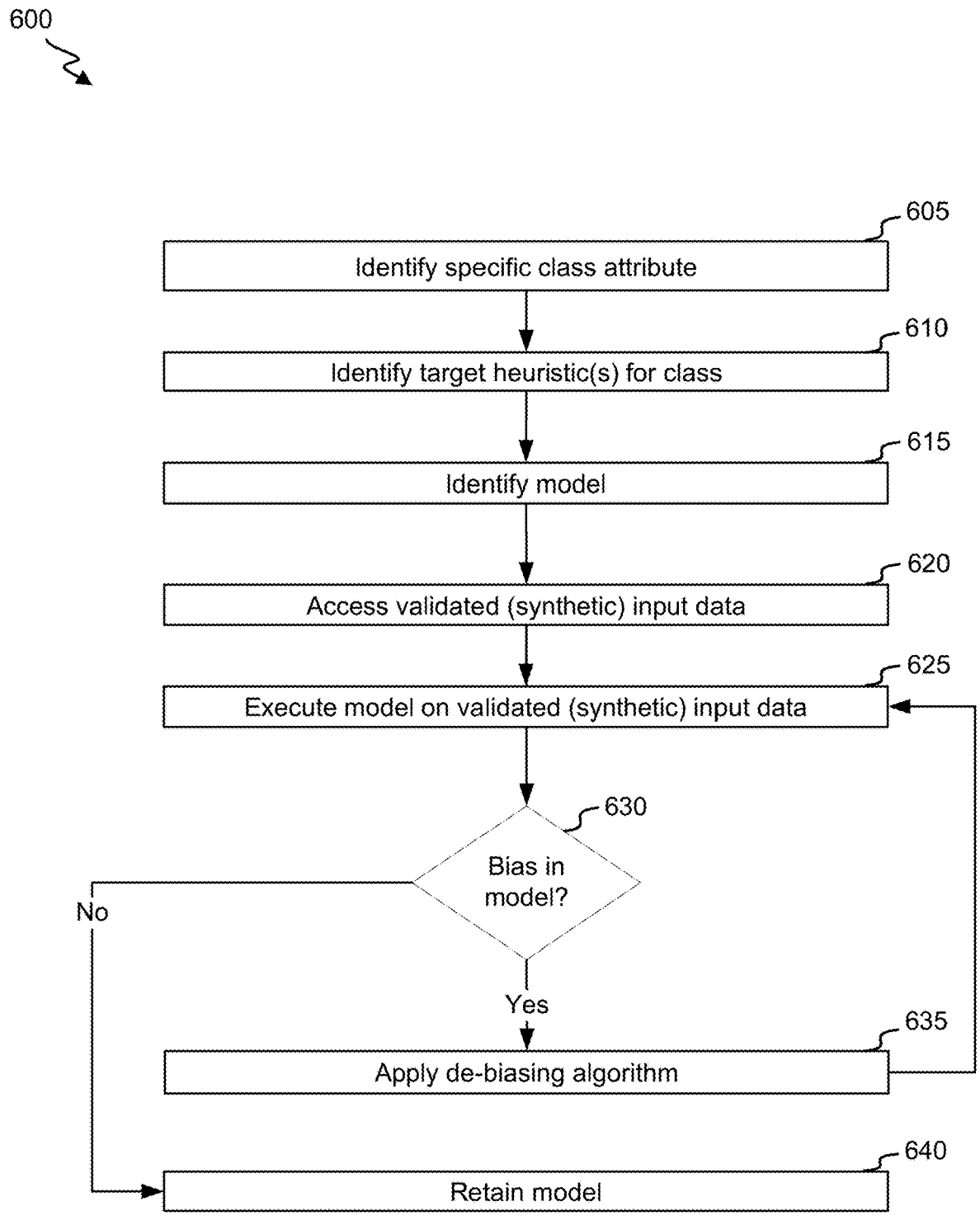
FIG. 6 illustrates an exemplary process for detecting and responding to a bias in a machine-learning model.

FIG. 6 illustrates an exemplary process 600 for detecting and responding to a bias in a machine-learning model. Process 600 begins at block 605 where a specific class attribute is identified. The specific class attribute may have been selected by a client and/or may correspond to a protected class for which one or more regulations apply. For example, a specific class attribute may include gender, race, religion, age, national origin, pregnancy status, familial status, disability status, or veteran status.

At block 610, one or more target heuristics is identified for the specific class attribute. The target heuristic may include for, example, a minimum acceptable fairness and/or a minimum acceptable accuracy. The target heuristic(s) may have been provided by a client system. The target heuristic may identify (for example) a minimum acceptable model fairness. The model fairness may be determined by (for example) determining whether and/or how drastically values for the specific class attribute influence model outputs. The model's fairness may be estimated using (for example) part or all of a training, validation and/or hold-out data set and/or by using synthetic inputs that include variation across potential values for the specific class attribute and otherwise vary from each other in a controlled manner.

At block 615, a trained machine-learning model is identified. The trained machine-learning model can include one that is to be used in a workflow and/or was trained using training data (e.g., that was potentially de-biased using a technique identified in FIG. 5). The machine-learning model may include a model that was selected by a client and/or that was provided by the client. The machine-learning model may include (for example) a classifier model (e.g., Naive Bayes, decision tree, k-Nearest Neighbor, etc.) or a regression model (e.g., a linear regression model, a logistic regression model, or a Support Vector Machine). The machine-learning model may have been using a supervised or unsupervised learning algorithm.

At block 620, validated input data is accessed. The validated input data may, but need not, be synthetic data that was created (e.g., for purposes of detecting or quantifying any model bias and/o for characterizing performance of the model). The validated input data may include (for example) publically available data (e.g., census data) and/or data privately available to the system (e.g., a population or all first-party customer data or a different segment of first-party customer data). The validated input data may include data elements with different values for the specific class attributes. For example, if gender was identified as the specific class attribute, the validated data may include 100 data elements that include a "male" value for the class attribute (and various values for other class attributes) and 100 data elements that include a "female" value for the class attribute (and various values for other class attributes). As another example, if age was identified as the specific class attribute values for age may be randomly or regularly pulled from a predefined age distribution.

At block 625, the validated (potentially synthetic) input data is processed using the trained machine-learning model. The processing can result in generating a predicted value for each data element. For example, the predicted value may predict whether a user is likely to click on particular content and/or order a product or service in response to receiving particular content. As another example, the predicted value may predict whether a job offer will be extended to the user. As yet another example, the predicted value may predict one or more terms (e.g., of a loan or insurance) that will be offered to the user. As yet another example, the predicted value may predict a product, price, or discount that—if identified in a communication to the user result—will result in the user purchasing the product.

At block 630, the predictions generated by the model at block 625 and any target heuristic identified at block 610 are used to determine whether there is a bias (e.g., an unacceptable bias) in the model. If so, process proceeds to block 635, where a de-biasing algorithm is applied. The de-biasing algorithm may (for example) include retraining the model using a training data set that is differently weighted or differentially sampled as compared to initial training; adjusting one or more parameters (e.g., using a formulaic or discriminator based approach); etc.

In some instances, after applying the de-biasing algorithm, process 600 returns to block 625 (not shown) to initiate a re-evaluation of whether and/or an extent to which the machine-learning model is (e.g., unacceptably—as defined based on a client-identified heuristic) biased. In some instances, the process repeats until any bias is of an acceptable magnitude, at which point process 600 can proceed to block 640, wherein the model is retained. The retained model can then be used to process non-training data, potentially in real-time. The retained model may alternatively or additionally be used to process streaming data.

When it is determined at block 630 that the model is no biased (e.g., beyond any acceptable amount) with regard to the specific class attribute, process 600 may proceed to block 640 to retain the model.

Retaining the model may include storing learned model parameters and/or availing the model to process new input data sets.

Figure 7:
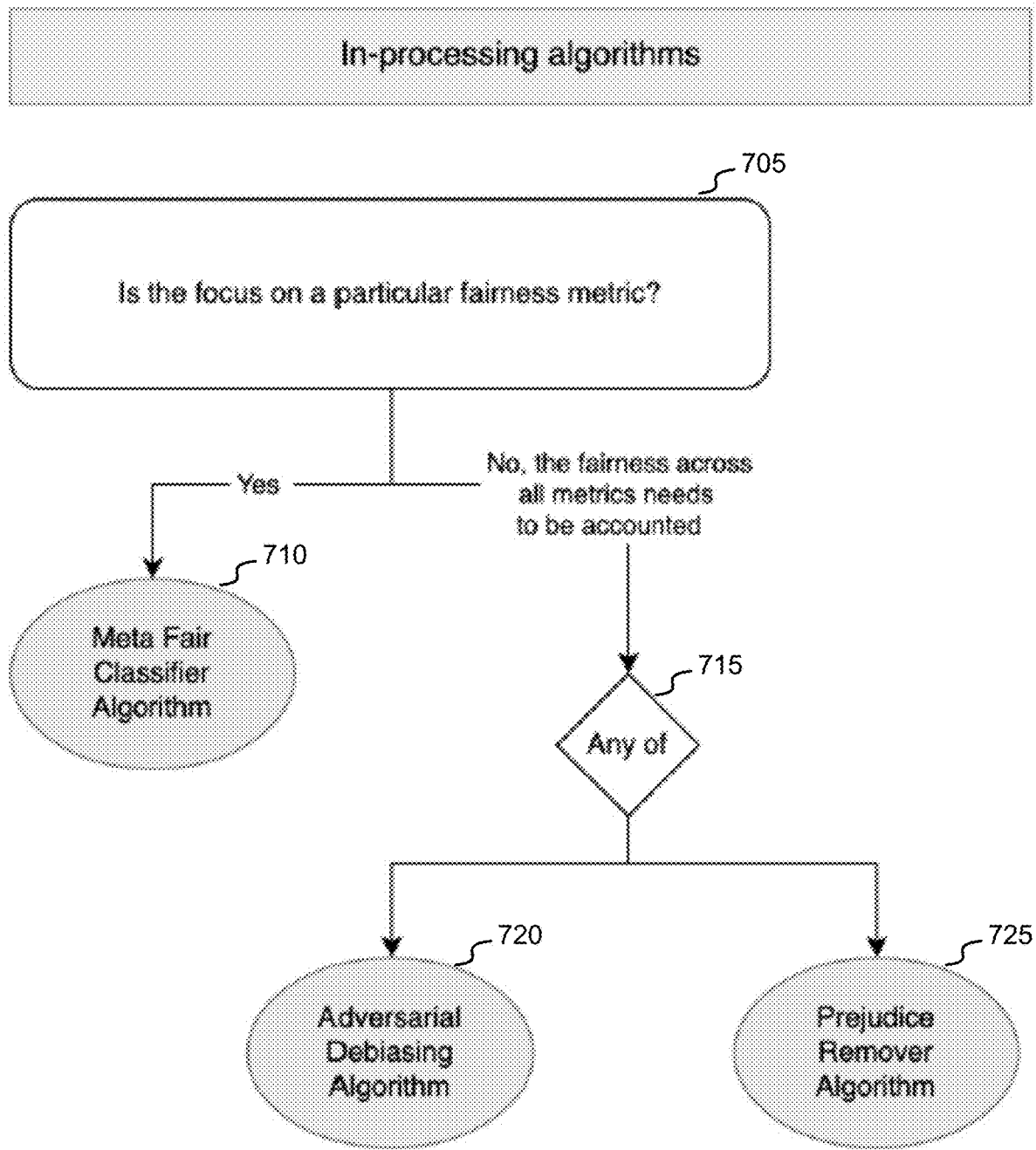
FIG. 7 depicts an exemplary process for selecting an algorithm to facilitate de-biasing a machine-learning model.

FIG. 7 depicts an exemplary process for selecting an algorithm to facilitate de-biasing a machine-learning model. At block 705, it is determined whether the de-biasing is focused on a particular fairness metric. If so, at block 710, a meta fair classifier algorithm is implemented to de-bias the model.

Otherwise, one or both of an adversarial de-biasing algorithm is applied at block 720 and/or a prejudice remover algorithm is applied at block 725. The adversarial de-biasing algorithm can include an in-processing technique that learns a classifier based on an optimization technique that prioritizes high prediction accuracy and simultaneously prioritizes a low ability of an adversary to determine the class attribute from the predictions. This latter prioritization can promote a fair classifier. The adversarial de-biasing algorithm can include one or more characteristics and/or operations as disclosed in B. H. Zhang, B. Lemoine, and M. Mitchell, "Mitigating Unwanted Biases with Adversarial Learning," Intelligence, Ethics, and Society, 2018, which is hereby incorporated by reference in its entirety for all purposes.

The prejudice remover algorithm can include an in-processing technique that adds a discrimination-aware regularization term to the learning objective. The prejudice remover algorithm can include one or more characteristics and/or operations as disclosed in T. Kamishima, S. Akaho, H. Asoh, and J. Sakuma, "Fairness-Aware Classifier with Prejudice Remover Regularizer," Joint European Conference on Machine Learning and Knowledge Discovery in Databases, 2012., which is hereby incorporated by reference in its entirety for all purposes.

Figure 8:
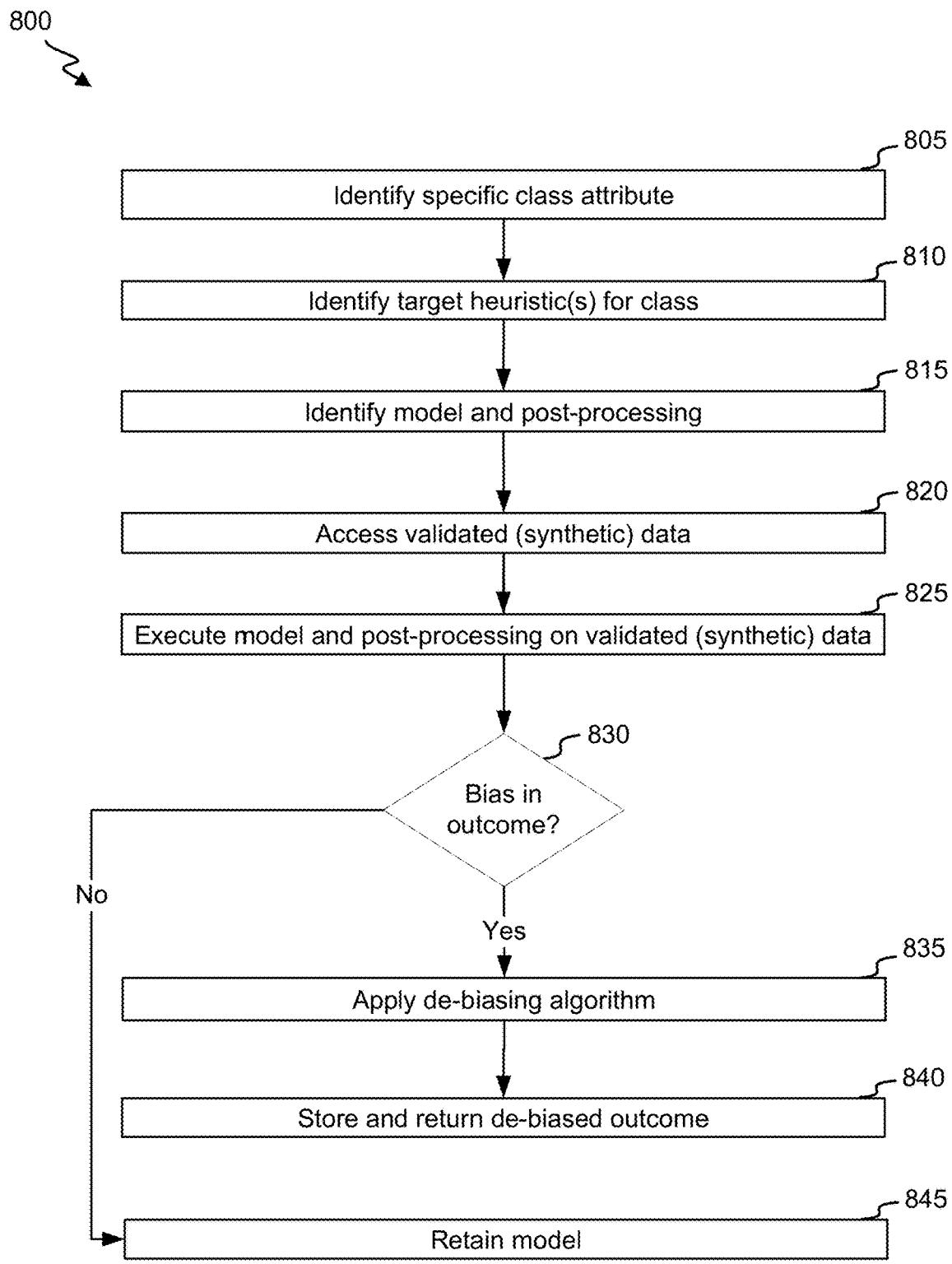
FIG. 8 illustrates an exemplary process for detecting and responding to a bias in post-processing of a model output.

FIG. 8 illustrates an exemplary process for detecting and responding to a bias in post-processing of a model output. Process 800 begins at block 805 where a specific class attribute is identified. The specific class attribute may have been selected by a client and/or may correspond to a protected class for which one or more regulations apply. For example, a specific class attribute may include gender, race, religion, age, national origin, pregnancy status, familial status, disability status, or veteran status.

At block 810, one or more target heuristics is identified for the specific class attribute. The target heuristic may include for, example, a minimum acceptable fairness and/or a minimum acceptable accuracy. The target heuristic(s) may have been provided by a client system. The target heuristic may identify (for example) a minimum portion of a population associated with a particular value for the class attribute that receives a given message or offer; a minimum statistic of an offer (e.g., average, median or mode) provided to users associated with a particular value of the class attribute relative to an offer provided to users associated with one or more other values, a minimum percentage of users associated with a particular value of the specific class attribute that were associated with a given type of workflow result, etc.

At block 815, a trained machine-learning model and one or more post-processing techniques are identified. The trained machine-learning model can include one that is to be used in a workflow and/or was trained using training data (e.g., that was potentially de-biased using a technique identified in FIG. 5). The machine-learning model may include a model that was selected by a client and/or that was provided by the client. The machine-learning model may include (for example) a classifier model (e.g., Naive Bayes, decision tree, k-Nearest Neighbor, etc.) or a regression model (e.g., a linear regression model, a logistic regression model, or a Support Vector Machine). The machine-learning model may have been using a supervised or unsupervised learning algorithm.

The post-processing technique(s) may be configured to (for example) transform an output from the machine-learning model into a normalized, categorical, or binary result. The result may indicate whether a given action is to be initiated or what action is to be initiated. For example, the result may identify a size of a discount that is to be offered in a communication transmitted to a user device.

At block 820, validated input data is accessed. The validated input data may, but need not, be synthetic data that was created (e.g., for purposes of detecting or quantifying any model bias and/o for characterizing performance of the model). The validated input data may include data elements with different values for the specific class attributes. For example, if gender was identified as the specific class attribute, the validated data may include 100 data elements that include a "male" value for the class attribute (and various values for other class attributes) and 100 data elements that include a "female" value for the class attribute (and various values for other class attributes). As another example, if age was identified as the specific class attribute values for age may be randomly or regularly pulled from a predefined age distribution.

At block 825, the validated (potentially synthetic) input data is processed using the trained machine-learning model and the post-processing technique(s). The processing can result in generating a predicted value for each data element. For example, the predicted value may predict whether a user is likely to click on particular content and/or order a product or service in response to receiving particular content. As another example, the predicted value may predict whether a job offer will be extended to the user. As yet another example, the predicted value may predict one or more terms (e.g., of a loan or insurance) that will be offered to the user. As yet another example, the predicted value may predict a product, price, or discount that—if identified in a communication to the user result—will result in the user purchasing the product.

At block 830, the predictions generated by the model at block 825 and any target heuristic identified at block 810 are used to determine whether there is a bias (e.g., an unacceptable bias) in results produces by a workflow (that uses the machine-learning model and the post-processing technique (s)). If so, process proceeds to block 835, where a de-biasing algorithm is applied. The de-biasing algorithm may (for example) include retraining the post-processing technique(s) using (for example) modified model output results. Each data element and each corresponding workflow result (e.g., generated after applying any applicable de-biasing algorithm) may then be stored and/or returned to another computing system.

In some instances, after applying the de-biasing algorithm at block 835, process 800 returns to block 825 (not shown) to initiate a re-evaluation of whether and/or an extent to which the machine-learning model and post-processing are (e.g., unacceptably—as defined based on a client-identified heuristic) biased. In some instances, the process repeats until any bias is of an acceptable magnitude, at which point process 800 can proceed to block 840, wherein the model is retained and a de-biased outcome is returned. The retained model can then be used to process non-training data, potentially in real-time. The retained model may alternatively or additionally be used to process streaming data.

When it is determined at block 830 that any bias is of an acceptable magnitude, process 800 may proceed to block 840 to retain the model. Retaining the model may include storing learned model parameters and/or availing the model to process new input data sets.

Figure 9:
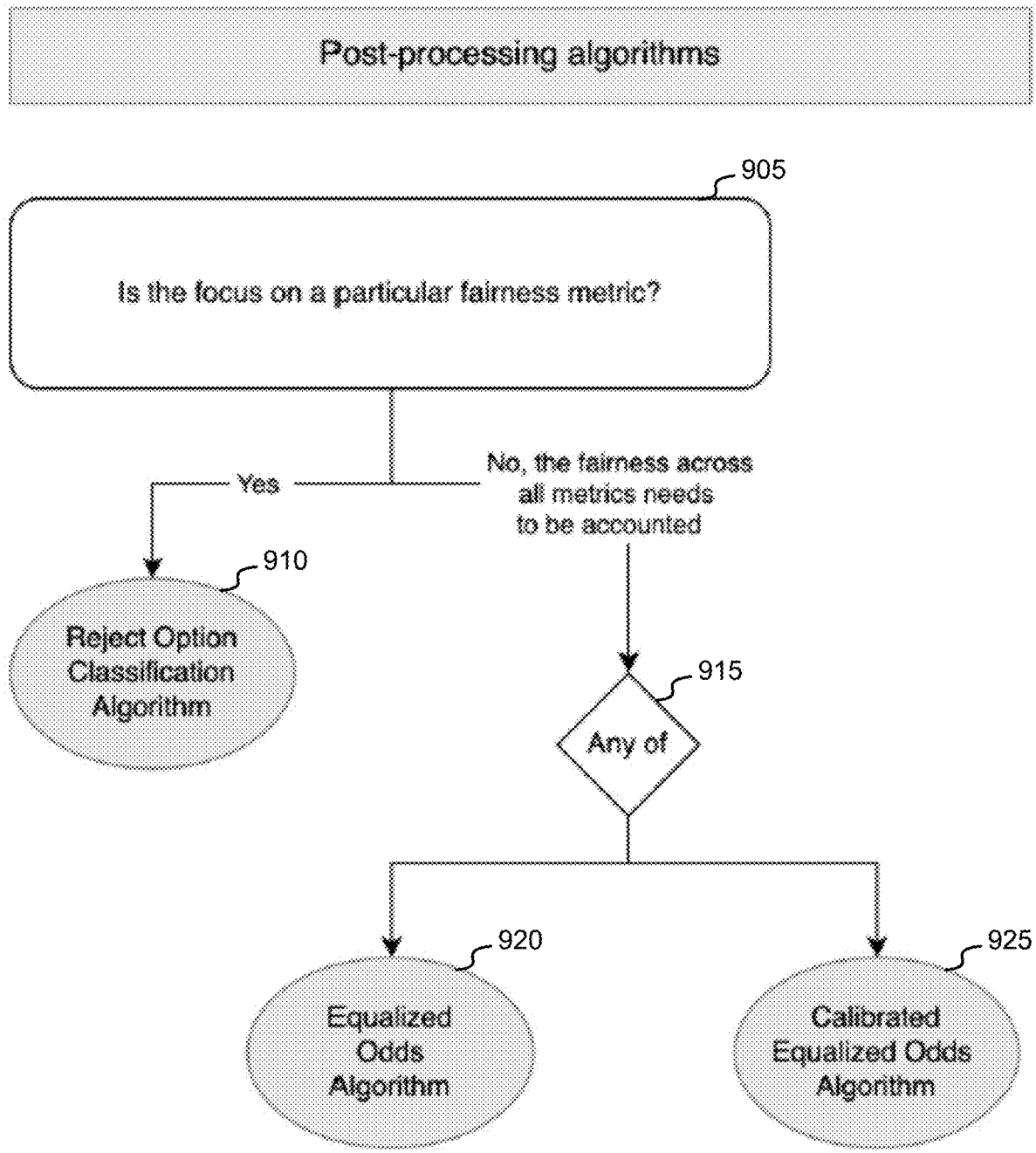
FIG. 9 depicts an exemplary process for selecting an algorithm to facilitate de-biasing of post-processing of a model output.

FIG. 9 depicts an exemplary process for selecting an algorithm to facilitate de-biasing of post-processing of a model output. At block 905, it is determined whether there is a focus on a particular type of fairness metric. If so, process 900 proceeds to block 910, where a Rejection Option Classification algorithm is applied. The Rejection Option Classification algorithm is configured to identify preliminary results within a confidence band (corresponding to highest uncertainty) around a decision boundary and to then provide an favorable outcome when a preliminary result within the band corresponds to an underprivileged group and an unfavorable outcome when a preliminary result within the band corresponds to a privileged group. Further details of the Rejection Option Classification algorithm are described in F. Kamiran, A. Karim, and X. Zhang, "Decision Theory for Discrimination-Aware Classification," IEEE International Conference on Data Mining, 2012., which is incorporated by reference in its entirety for all purposes.

Otherwise, process 900 proceeds to block 915 to apply either of a Calibrated Equalized Odds algorithm or a Calibrated Odds algorithm. The Calibrated Equalized Odds algorithm can be configured to optimize over calibrated classifier score outputs that lead to fair output labels. More specifically, a probability range is identified for which output labels are to be changed using an equalized odds objectives, and then results associated with probabilities within the range are post-processed using the equalized odds objectives. The Equalized Odds algorithm can be configured to modify a label predicted by post-processing using an optimization to make predictions more fair. Another post-processing technique that may be used in addition to or instead of an Calibrated Equalized Odds algorithm or a Calibrated Odds algorithm includes an algorithm disclosed in G. Pleiss, M. Raghavan, F. Wu, J. Kleinberg and K. Q. Weinberger, "On Fairness and Calibration", available at https://proceedings.neurips.cc/paper/2017/file/b8b9c74ac526fffbeb2d39ab038d1cd7-Paper.pdf and M. Hardt, E. Price and N. Srebro, "Equality of Opportunity in Supervised Learning", available at https://home.ttic.edu/~nati/Publications/HardtPriceSrebro2016.pdf. Each of these references is hereby incorporated by reference in its entirety for all purposes.

Figure 10:
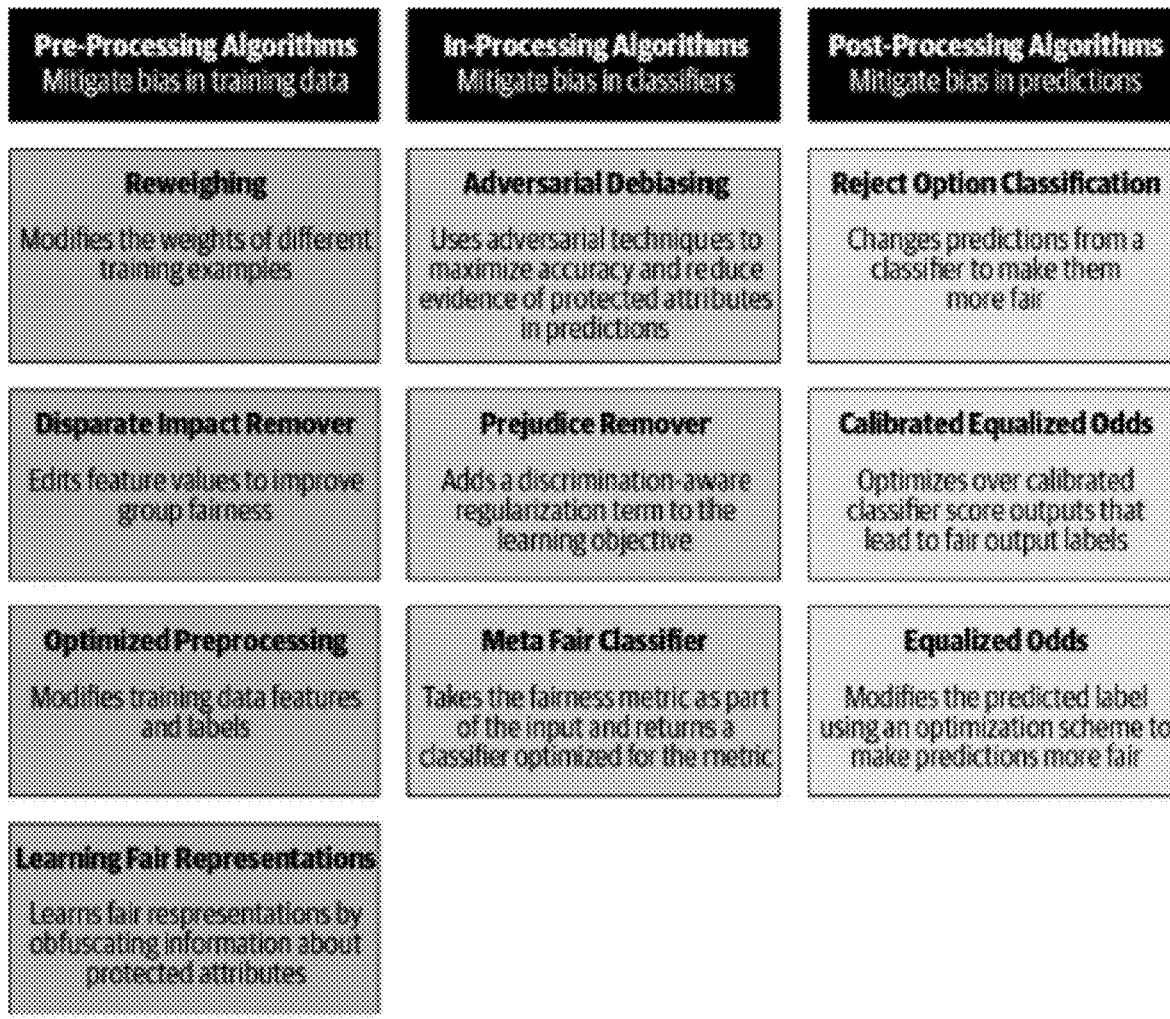
FIG. 10 shows representation of select de-biasing algorithms.

FIG. 10 shows representation of select de-biasing algorithms. More specifically, FIG. 10 identifies multiple de-biasing algorithms that may be applied for each of multiple processing stages in a workflow. In some instances, if it is determined that a processing stage is biased to at least a threshold degree (e.g., indicated as being unacceptable via a heuristic), a single de-biasing algorithm is selected. In other instances, each of multiple de-biasing algorithms are applied.

Exemplary de-biasing algorithms that may be applied during a pre-processing stage include: a reweighing algorithm (that modifies weights of different input data elements); a Disparate Impact Remover algorithm (that edits feature values to improve group fairness); an Optimized Preprocessing algorithm (that modifies training data features and labels) and/or a Learning Fair Representation algorithm (the learns fair representations by obfuscating information about protected attributes).

Exemplary de-biasing algorithms that may be applied during an in-processing stage include: an Adversarial Debiasing algorithm (that uses an adversarial technique to facilitate or maximize accuracy and reduce evidence of specific class attributes in predictions); a Prejudice Remover algorithm (that adds a bias-aware regularization term to a learning objective); and/or a Meta Fair Classifier (that takes a fairness metric as part of input and returns a classifier optimized for the metric).

Exemplary de-biasing algorithms that may applied during a post-processing stage include: a Reject Option algorithm (that changes predictions from a classifier to improve fairness); a Calibrated Equalized Odds algorithm (that optimizes over-calibrated classifier score outputs to promote fair outputs); and/or an Equalized Odds algorithm (that modified predicted outputs using an optimization scheme to improve fairness). An Equalized Odds algorithm can be used as a post-processing technique to solve a linear program to find probabilities with which to change output labels to optimize equalized odds. The Equalized Odds algorithm can include one or more features, uses, or operations as disclosed in M. Hardt, E. Price, and N. Srebro, "Equality of Opportunity in Supervised Learning," Conference on Neural Information Processing Systems, 2016; and/or G. Pleiss, M. Raghavan, F. Wu, J. Kleinberg, and K. Q. Weinberger, "On Fairness and Calibration," Conference on Neural Information Processing Systems, 2017.CalibratedEqOddsPostprocessing(Transformer) (each of which is incorporated by reference in its entirety for all purposes). A Calibrated Equalized Odds algorithm can be used as a post-processing technique to optimize over calibrated classifier score outputs to find probabilities with which to change output labels using an equalized odds objective. The Calibrated Equalized Odds algorithm can include one or more features, uses, or operations as disclosed in G. Pleiss, M. Raghavan, F. Wu, J. Kleinberg, and K. Q. Weinberger, "On Fairness and Calibration," Conference on Neural Information Processing Systems, 2017, which is hereby incorporated by reference in its entirety for all purposes.

Figure 11:
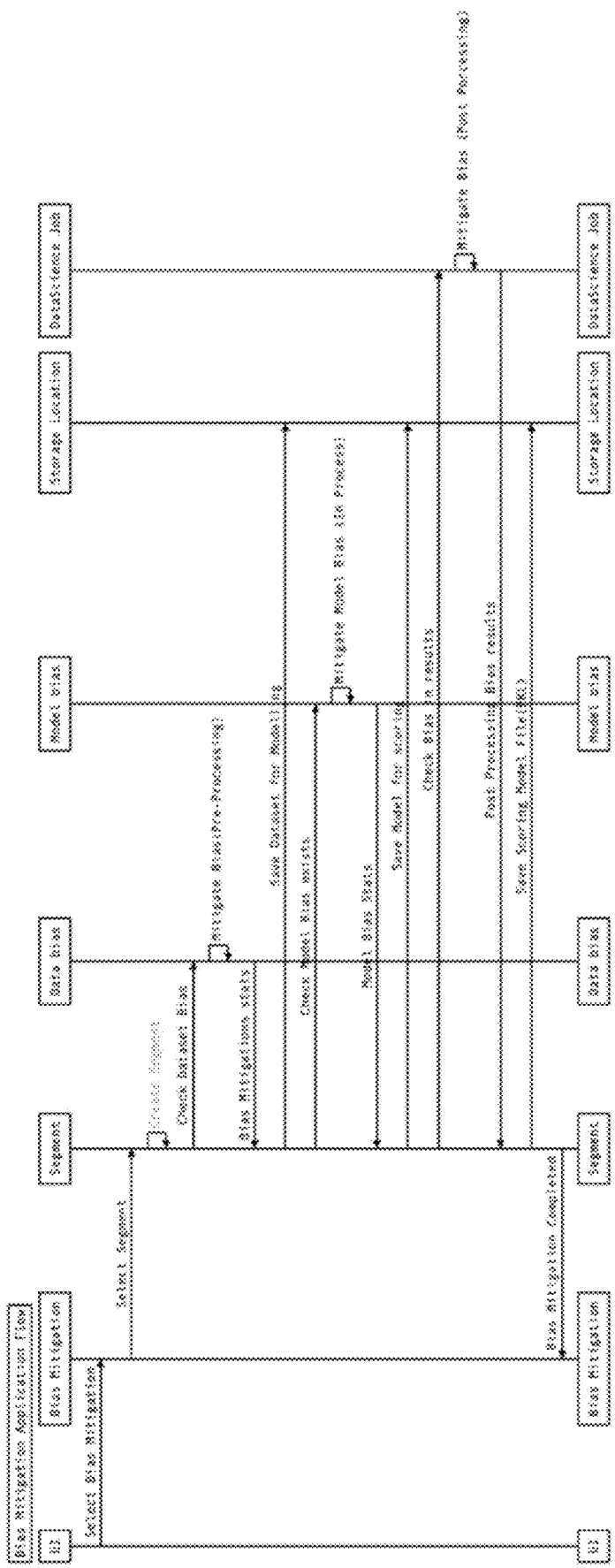
FIG. 11 illustrates a sequence diagram that of performing integrated de-biasing.

FIG. 11 illustrates a sequence diagram that of performing integrated de-biasing. The integrated de-biasing may be (for example) coordinated by ensemble bias mitigator 170. After a bias mitigation is initiated, a "segment" is defined that identifies an input data set (e.g., corresponding to a set of users or to one or more predefined user attributes) and any corresponding label set. The segment may be defined at least in part by a client system. Pre-processing bias assessments are then performed to determine whether any bias in the input set corresponding to the segment is unacceptably high. If so, an input-data bias mitigation algorithm is performed, and one or more statistics pertaining to the mitigation may be returned to the client system. Further, the de-biased input data set and any corresponding label set is stored.

The (e.g., de-biased) input data set and potentially the corresponding label set is used to train a machine-learning model. It is then determined whether the machine-learning model is biased. If so, a model bias mitigation algorithm is performed, and one or more statistics pertaining to the mitigation may be returned to the client system. Further, the trained (and potentially bias-mitigated) model is stored.

An assessment is then performed to determine whether results produced by the (e.g., trained and/or bias-mitigated) machine-learning model and/or results produced based on outputs generated by the (e.g., trained and/or bias-mitigated) machine-learning model are biased. If so, a post-processing bias mitigation algorithm is performed, and an updated version of the bias mitigation algorithm (defined after application of the post-processing bias mitigation algorithm) is stored.

A workflow that then uses the bias-mitigated pre-processing, bias-mitigated model, and/or bias-mitigated post-processing can then be used to transform new inputs into a result. Each result (corresponding to a given input data set associated with a given user device) that may identify whether a given action is to be performed in association with the user device, what type of action is to be performed in association with the user device, whether a given communication is to be delivered to the user device, and/or what communication is to be delivered to the user device.

One or more fairness metrics (e.g., associated with an original and/or de-biased processing stage and/or with an original and/or de-biased workflow) may then be stored and/or transmitted to a client device. A fairness metric may pertain to each of one or more segments, each of one or more class attributes, and/or one of particular values for a given class attribute. For example, a fairness metric may identify a fairness as it pertains to age, thereby indicating an extent to which results are biased towards or against any given age group. As another example, a fairness metric may be generated for each of multiple age groups, where the fairness metric indicates the extent to which results are biased against the age group.

In some instances, multiple fairness metrics are stored and/or transmitted to a client device to facilitate a comparison between an original and de-biased processing stages and/or a comparison between an original de-biased workflow. For example, an interface may—for a given class—identify a fairness metric associated with an original workflow (or original processing stage) and also a fairness metric associated with a de-biased workflow (or de-biased processing stage). The metrics may be presented (for example) concurrently or sequentially. The interface may additionally identify one or more other metrics (e.g., pertaining to accuracy) for each of the original workflow (or original processing stage), such as a metric that characterizes an accuracy.

The interface or another interface may include an input component configured to indicate whether the de-biased processing stage (or de-biased workflow) is accepted or rejected (e.g., in favor of an original processing stage or original workflow).

Exemplary Interfaces and Statistics for Facilitating De-Biasing

FIG. 12A shows exemplary results that can guide user-controlled and/or automated de-biasing actions. The depicted illustrative data pertains to a protected class attribute of race. Part or all of the depicted data may be generated and/or availed to a client device to facilitate detecting whether any bias exists for the class attribute and how to remedy any such bias.

In the depicted case, the presented data identifies a distribution across races in a baseline population (e.g., corresponding to a customer base, country, region, etc.); in a training data set; and in a population for which an offer was availed. Further, for each of the identified races, the interface identifies a median output from a machine-learning model used in the workflow.

A client may use this data to detect discrepancies in various populations and/or in model outputs. In some instances, a client may then be able to initiate a de-biasing algorithm based on a selection informed by the data.

FIG. 12B shows an exemplary interface that identifies an extent to which implementing any of various algorithms is predicted to change a representation in an offer population after applying the technique. The depicted instance represents that biases corresponding to "Native Hawaiian or Other Pacific Islander" are attempting to mitigated. Thus, at each stage, the algorithm that lends to the highest improvement in bias is bolded. For example, if it was initially discovered that overall or stage-specific result were biased against user data sets associated with "Native Hawaiian or Other Pacific Islander", implementing algorithms associated with the bolded cells may reduce the bias.

Figure 13:
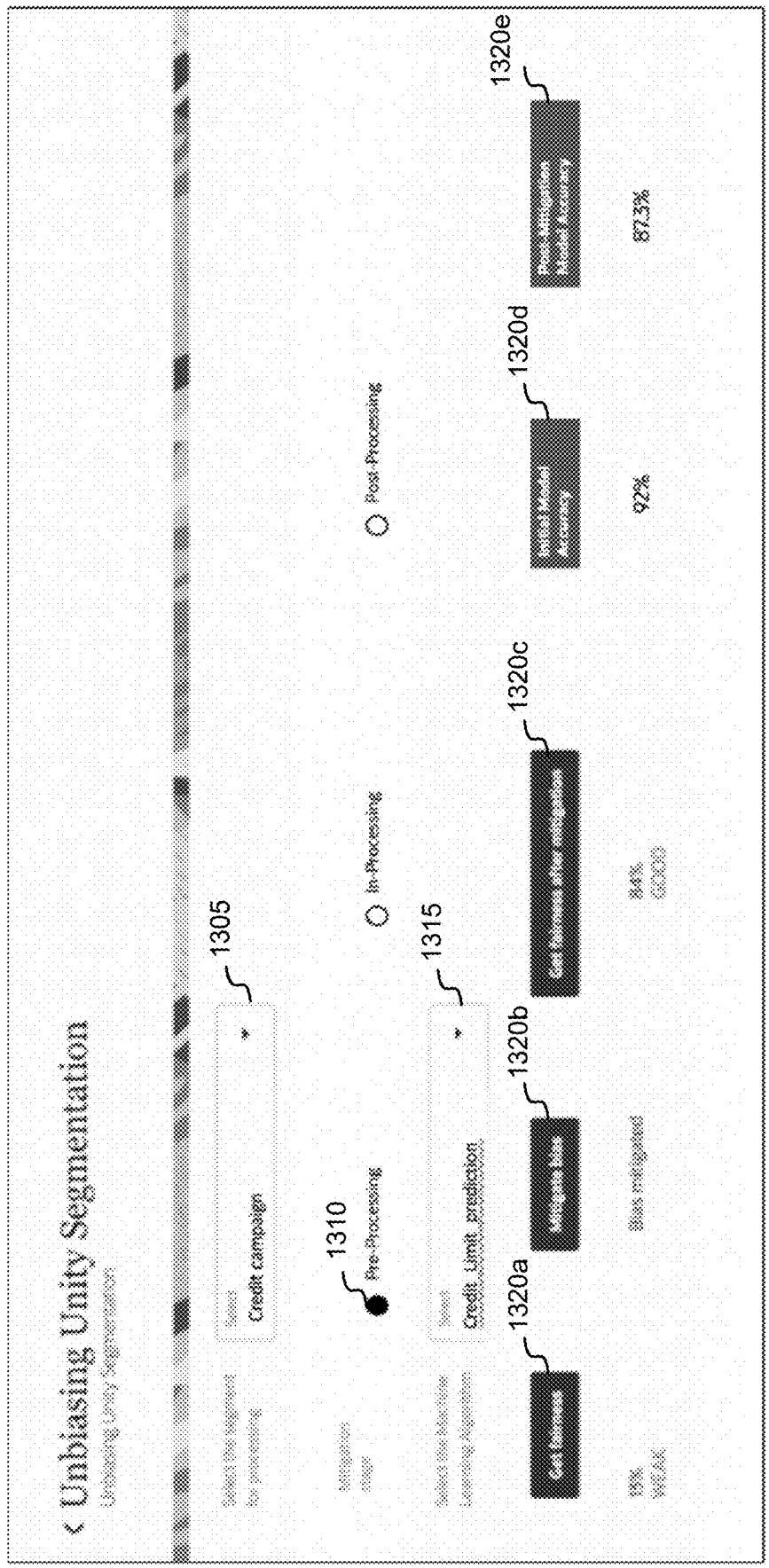
FIG. 13 shows an exemplary interface for receiving de-biasing instructions and presenting results representing an impact of de-biasing on fairness and accuracy.

FIG. 13 shows, for each of the processing stages, a degree to which applying each of multiple de-biasing techniques would improve (i.e., reduce) a bias against the particular. At each stage, the algorithm associated with the greatest improvement is bolded. A data-selection component 1305 is configured to receive an identification of which data is to be assessed for bias considerations.

A stage-selection component 1310 is configured to receive a selection of which processing stage is to be assessed for biasing assessments and/or de-biasing efforts. A model-selection component 1315 is configured to receive a selection of a particular model that is to be used to process the data selected via data-selection component 1305. A set of action-initiating buttons 1320*a*-1320*e* initiate actions for assessing metrics and/or mitigating bias. Specifically, activating button 1320*a* triggers an assessment to determine an extent to which the pre-processing of the data selected via the data-selection component 1305 is fair. Activating button 1320*b* triggers mitigating any such bias. Activating button 1320*c* triggers determining and present a fairness metric after such mitigation.

While the mitigation associated with the pre-processing may facilitate overall fairness, such fairness improvement has the potential to influence downstream accuracy. Thus, activating buttons 1320*d* and 1320*e* triggers determining and presenting an accuracy of a machine-learning model and post-processing after the initial mitigation was performed.

Example Systems for Real-Time Deployment Management

Figure 14:
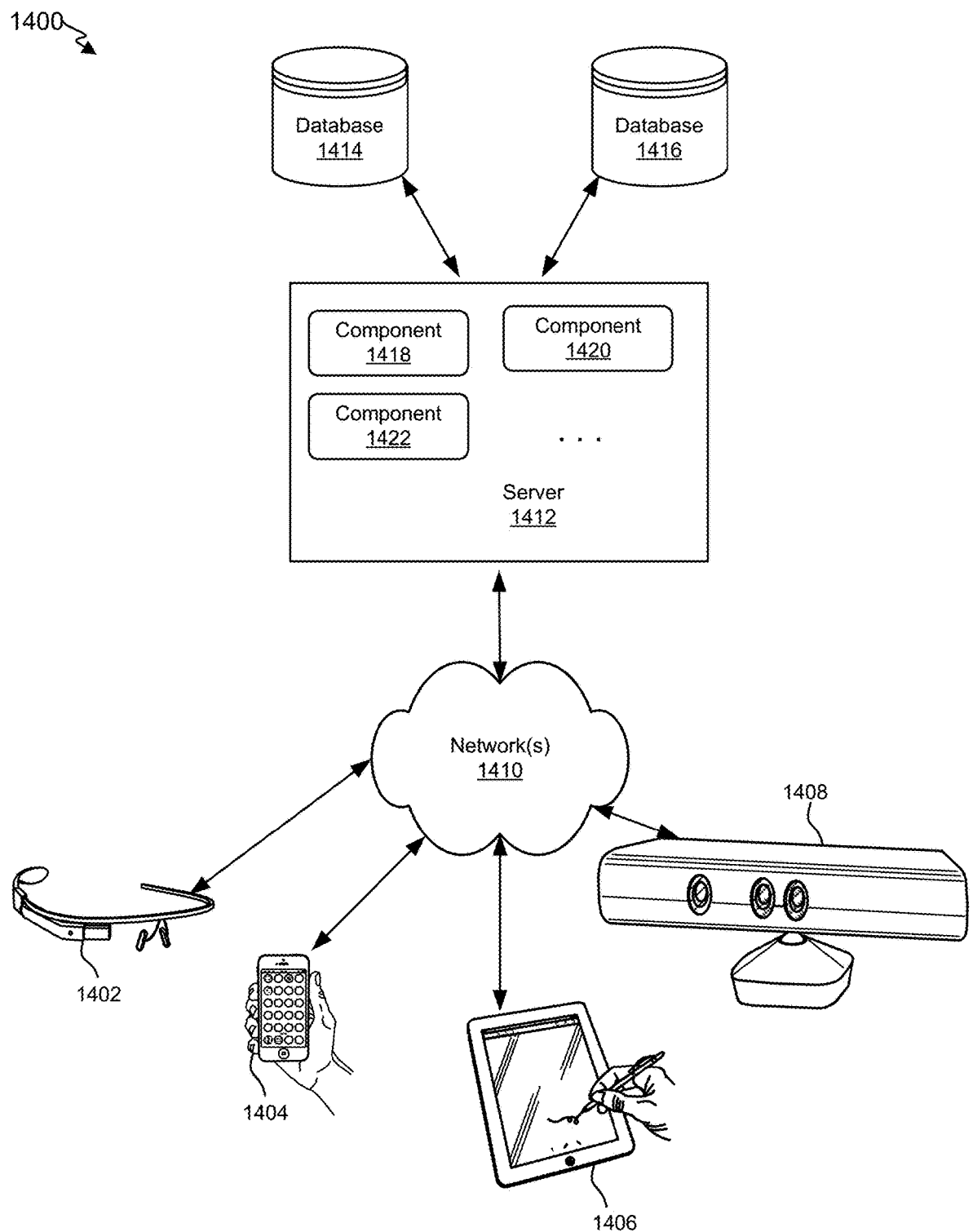
FIG. 14 depicts a simplified diagram of a distributed system for implementing one of the embodiments.

FIG. 14 depicts a simplified diagram of a distributed system 1400 for implementing one of the embodiments. In the illustrated embodiment, distributed system 1400 includes one or more user computing devices 1402 and 1404 and one or more client computing devices 1406 and 1408, which are configured to execute and operate a client application such as a web browser, proprietary client (e.g., Oracle Forms), or the like over one or more network(s) 1410. Server 1412 may be communicatively coupled with remote user computing devices 1402 and 1404 and with remote client computing devices 1406 and 1408 via network 1410.

In various embodiments, server 1412 may be adapted to run one or more services or software applications provided by one or more of the components of the system. In various embodiments, these services (e.g., executing a workflow, such as a workflow that results in content transmissions to user devices; and/or de-biasing one or more actions performed during the workflow) may be offered as web-based or cloud services or under a Software as a Service (SaaS) model to clients using client computing devices 1406 and/or 1408. Further, these services may include availing or facilitating in the availing of a digital form to user devices 1402 and/or 1404 (and determining which predicted field values to include in the availed form) and/or processing form response data sets determined based on input received at user devices 1402 and/or 1404. Clients operating client computing devices 1406 and/or 1408 and users operating user computing devices 1402 and/or 1404 may in turn utilize one or more client applications and/or one or more user interactions to interact with server 1412 to utilize the services provided by these components.

In the configuration depicted in the figure, the software components 1418, 1420 and 1422 of system 1400 (e.g., that control part or all of a workflow and/or that facilitate de-biasing of part or all of the workflow) are shown as being implemented on server 1412. In other embodiments, one or more of the components of system 1400 and/or the services provided by these components may also be implemented by user computing devices 1402 and/or 1404 or client computing devices 1406 and/or 1408. These components may be implemented in hardware, firmware, software, or combinations thereof. It should be appreciated that various different system configurations are possible, which may be different from distributed system 1400. The embodiment shown in the figure is thus one example of a distributed system for implementing an embodiment system and is not intended to be limiting.

User computing device 1402 and/or 1404 and/or client computing device 1406 and/or 1408 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. User computing device 1402 and/or 1404 and/or client computing device 1406 and/or 1408 can be a general purpose personal computer including, by way of example, a personal computer or laptop computer running various versions of Microsoft Windows®, Apple Macintosh®, and/or Linux operating systems. User computing device 1402 and/or 1404 and/or client computing device 1406 and/or 1408 can be a workstation computer running any of a variety of commercially-available UNIX® or UNIX-like operating systems, including without limitation the variety of GNU/Linux operating systems, such as for example, Google Chrome OS. Alternatively, or in addition, user computing device 1402 and/or 1404 and/or client computing device 1406 and/or 1408 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1410.

Although exemplary distributed system 1400 is shown with two user computing devices and two client computing devices, any number of user computing devices and any number of client computing devices may be supported. Other devices, such as devices with sensors, etc., may interact with server 1412.

Network(s) 1410 in distributed system 1400 may be any type of network familiar to those skilled in the art that can support data communications using any of a variety of commercially available protocols, including without limitation TCP/IP (transmission control protocol/Internet protocol), SNA (systems network architecture), IPX (Internet packet exchange), AppleTalk, and the like. Merely by way of example, network(s) 1410 can be a local area network (LAN), such as one based on Ethernet, Token-Ring and/or the like. Network(s) 1410 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1412 may be adapted to run one or more services or software applications described in the foregoing disclosure. For example, server 1412 may correspond to a server for performing processing described above according to an embodiment of the present disclosure.

Server 1412 may run an operating system including any of those discussed above, as well as any commercially available server operating system. Server 1412 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1412 may include one or more applications to perform an operation disclosed herein, such as an application disclosed in relation to FIG. 1. Server 1412 may include (for example) part or all of bias mitigation system 120, one or more depicted components of bias mitigation system 120, and/or part or all of workflow controlling system 110. Server 1412 may be configured to perform part or all of process 400 (depicted in FIG. 4), part or all of process 500 (depicted in FIG. 5), part or all of process 600 (depicted in FIG. 6), part or all of process 700 (depicted in FIG. 7), part or all of process 700 (depicted in FIG. 7) and/or part or all of process 800 (depicted in FIG. 8).

Distributed system 1400 may also include one or more databases 1414 and 1416. Databases 1414 and 1416 may reside in a variety of locations. By way of example, one or more of databases 1414 and 1416 may reside on a non-transitory storage medium local to (and/or resident in) server 1412. Alternatively, databases 1414 and 1416 may be remote from server 1412 and in communication with server 1412 via a network-based or dedicated connection. In one set of embodiments, databases 1414 and 1416 may reside in a storage-area network (SAN). Similarly, any necessary files for performing the functions attributed to server 1412 may be stored locally on server 1412 and/or remotely, as appropriate. In one set of embodiments, databases 1414 and 1416 may include relational databases, such as databases provided by Oracle, that are adapted to store, update, and retrieve data in response to SQL-formatted commands. Databases 1414 and 1416 may include (for example) data used to generated input data sets that are processed by machine-learning model 112, training data that is used to train machine-learning model 112, and/or data (e.g., training or validation data) that is used to identify a confidence-metric threshold.

Figure 15:
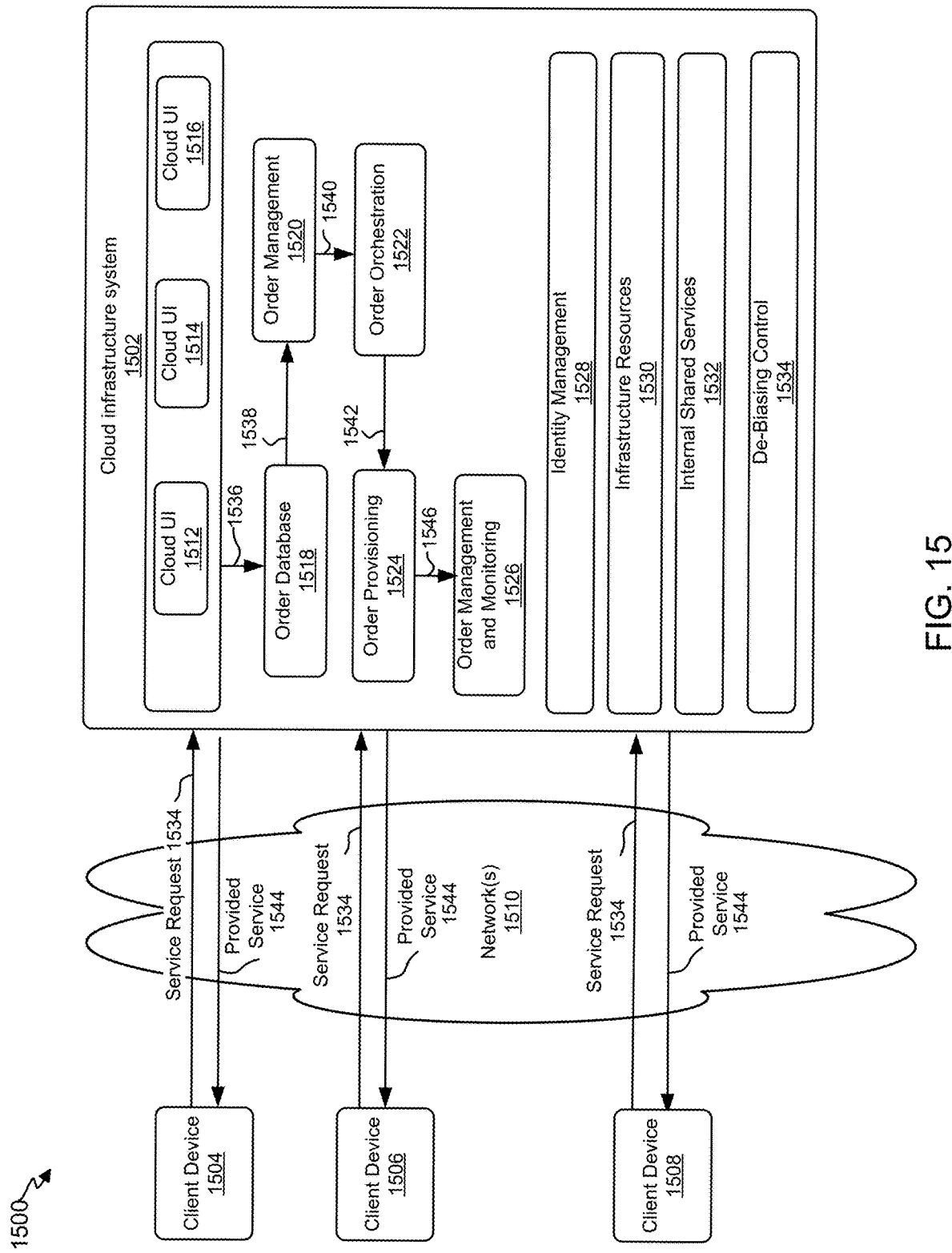
FIG. 15 is a simplified block diagram of components of a system environment by which services provided by the components of an embodiment system may be offered as cloud services, in accordance with an embodiment of the present disclosure.

FIG. 15 is a simplified block diagram of one or more components of a system environment 1500 by which services provided by one or more components of an embodiment system may be offered as cloud services, in accordance with an embodiment of the present disclosure. In the illustrated embodiment, system environment 1500 includes one or more user computing devices 1504 and 1506 and one or more client computing devices 1508 that may be used by users to interact with a cloud infrastructure system 1502 that provides cloud services. The user computing devices 1504 and 1506 may be configured to use a user application, such as one provided via a webpage that is provided by a web browser controlled by cloud infrastructure system. The client computing devices 1508 may be configured to operate a client application such as a web browser, a proprietary client application (e.g., Oracle Forms), or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the embodiment shown in the figure is only one example of a cloud infrastructure system that may incorporate an embodiment of the invention. In some other embodiments, cloud infrastructure system 1502 may have more or fewer components than shown in the figure, may combine two or more components, or may have a different configuration or arrangement of components.

User and client computing devices 1504, 1506, and 1508 may be devices similar to those described above for 1402, 1404, 1406, and 1408.

Although exemplary system environment 1500 is shown with two user computing devices and one client computing device, any number of user and client computing devices may be supported. Other devices such as devices with sensors, etc. may interact with cloud infrastructure system 1502.

Network(s) 1510 may facilitate communications and exchange of data between user computing devices 1504 and 1506 and cloud infrastructure system 1502 and between client computing device 1508 and cloud infrastructure system 1502. Each network may be any type of network familiar to those skilled in the art that can support data communications using any of a variety of commercially-available protocols, including those described above for network(s) 1510.

Cloud infrastructure system 1502 may comprise one or more computers and/or servers that may include those described above for server 1412.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. A service provided by the cloud infrastructure system can include performing one or more actions disclosed herein (e.g., one or more actions disclosed as being performed or potentially being performed by bias mitigation system 120, by one or more components of bias mitigation system 120, and/or by workflow controlling system 110). A service provided by the cloud infrastructure system may include using a workflow (e.g., campaign) to determine to which user systems 115 specific content will be provided, using a workflow to customize or generate content that is to be provided to one or more user systems 115, and/or to de-bias part or all of a workflow that is used to influence content distribution to user systems 115.

Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1502 may be adapted to automatically provision, manage and track a customer's subscription to services offered by cloud infrastructure system 1502. Cloud infrastructure system 1502 may provide the cloud services via different deployment models. For example, services may be provided under a public cloud model in which cloud infrastructure system 1502 is owned by an organization selling cloud services (e.g., owned by Oracle) and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In various embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In various embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, clients can utilize applications executing on the cloud infrastructure system. Clients can acquire the application services without the need for customers to purchase separate licenses and support. Various different SaaS services may be provided. Examples include, without limitation, services that provide solutions for sales performance management, enterprise integration, and business flexibility for large organizations.

In various embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Clients can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, clients can employ programming languages and tools supported by the cloud infrastructure system and also control the deployed services. In various embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1502 may also include infrastructure resources 1530 for providing the resources used to provide various services to clients of the cloud infrastructure system. In one embodiment, infrastructure resources 1530 may include pre-integrated and optimized combinations of hardware, such as servers, storage, and networking resources to execute the services provided by the PaaS platform and the SaaS platform.

In various embodiments, resources in cloud infrastructure system 1502 may be shared by multiple clients and/or multiple users and dynamically re-allocated per demand. Additionally, resources may be allocated to clients and/or users in different time zones. For example, cloud infrastructure system 1530 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system.

In one embodiment, as depicted in the figure, cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In exemplary operation 1534, a user using a user device, such as user device 1504 or 1506, may interact with cloud infrastructure system 1502 by requesting one or more services provided by cloud infrastructure system 1502 and requesting information about a subscription for one or more services offered by cloud infrastructure system 1502. The content that is provided to the user device 1504 about the service(s) and/or the subscription (e.g., including) a price may be selected in accordance with a workflow that transforms input data pertaining to user device 1504 into an output that at least partly defines the content. The workflow may have been de-biased using one or more techniques disclosed herein.

In certain embodiments, the user may access a cloud User Interface (UI), cloud UI 1512, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1512, 1514 and/or 1516.

At operation 1536, the order is stored in order database 1518. Order database 1518 can be one of several databases operated by cloud infrastructure system 1518 and operated in conjunction with other system elements.

At operation 1538, the order information is forwarded to an order management module 1520. In some instances, order management module 1520 may be configured to perform billing and accounting functions related to the order, such as verifying the order, and upon verification, booking the order.

At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain embodiments, order orchestration module 1522 enables the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order. Order provisioning module 1524 enables the allocation of resources for the services ordered by the customer. Order provisioning module 1524 provides a level of abstraction between the cloud services provided by cloud infrastructure system 1500 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1544, once the services and resources are provisioned, a notification of the provided service may be sent to users on user devices 1504 and/or 1506 by order provisioning module 1524 of cloud infrastructure system 1502.

At operation 1546, the user's order may be managed and tracked by an order management and monitoring module 1526. In some instances, order management and monitoring module 1526 may be configured to collect usage statistics for the services in the order, such as the amount of storage used, the amount data transferred, the number of users, and the amount of system up time and system down time.

In certain embodiments, cloud infrastructure system 1500 may include an identity management module 1528. Identity management module 1528 may be configured to provide identity services, such as access management and authorization services in cloud infrastructure system 1500. In various embodiments, identity management module 1528 may control information about users and/or clients who wish to utilize the services provided by cloud infrastructure system 1502. Such information can include information that authenticates the identities of such users and/or clients and information that describes which actions those customers are authorized to perform relative to various system resources (e.g., files, directories, applications, communication ports, memory segments, etc.) Identity management module 1528 may also include the management of descriptive information about each user and/or client and about how and by whom that descriptive information can be accessed and modified.

In certain embodiments, cloud infrastructure system 1500 includes a de-biasing control 1534, which can be configured to detect bias (e.g., in a training data set, model, and/or result set) and/or to reduce and/or eliminate such bias. De-biasing control 1534 may use any technique described herein (e.g., in association with any of FIGS. 4-9) to detect any bias and/or to mitigate a bias. In some instances, de-biasing control 1534 includes part or all of bias mitigation system 120 from FIG. 1.

Figure 16:
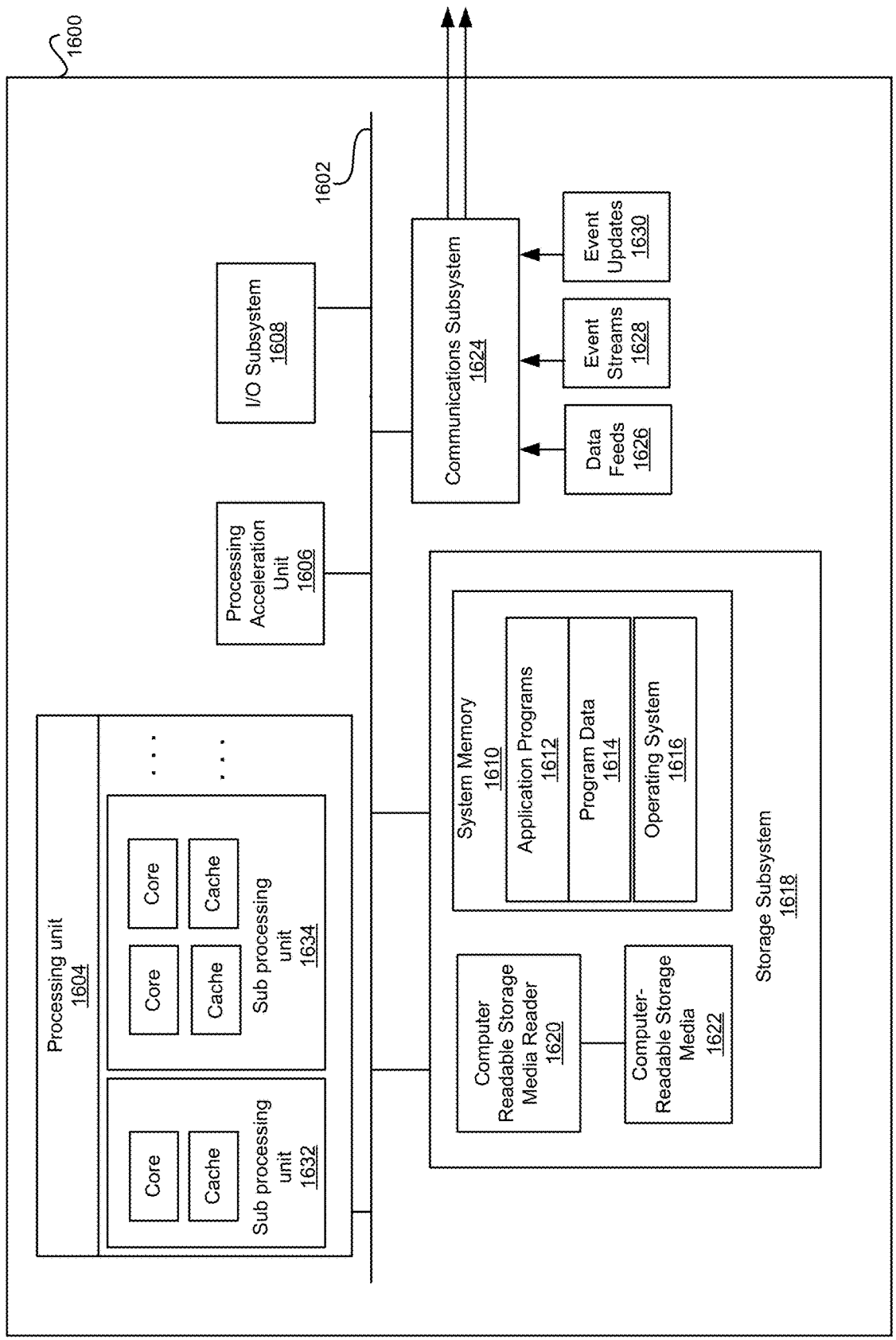
FIG. 16 illustrates an exemplary computer system, in which various embodiments of the present invention may be implemented.

FIG. 16 illustrates an exemplary computer system 1600, in which various embodiments of the present invention may be implemented. The system 1600 may be used to implement any of the computer systems described above (e.g., client system 105, workflow controlling system 110, or bias mitigation system 120). As shown in the figure, computer system 1600 includes a processing unit 1604 that communicates with a number of peripheral subsystems via a bus subsystem 1602. These peripheral subsystems may include a processing acceleration unit 1606, an I/O subsystem 1608, a storage subsystem 1618 and a communications subsystem 1624. Storage subsystem 1618 includes tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain embodiments, processing unit 1604 may be implemented as one or more independent processing units 1632 and/or 1634 with single or multicore processors included in each processing unit. In other embodiments, processing unit 1604 may also be implemented as a quad-core processing unit formed by integrating two dual-core processors into a single chip.

In various embodiments, processing unit 1604 can execute a variety of programs in response to program code and can maintain multiple concurrently executing programs or processes. At any given time, some or all of the program code to be executed can be resident in processor(s) 1604 and/or in storage subsystem 1618. Through suitable programming, processing unit(s) 1604 can provide various functionalities described above. Computer system 1600 may additionally include a processing acceleration unit 1606, which can include a digital signal processor (DSP), a special-purpose processor, and/or the like.

I/O subsystem 1608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that comprises software elements, shown as being currently located within a system memory 1610. System memory 1610 may store program instructions that are loadable and executable on processing unit 1604, as well as data generated during the execution of these programs.

Depending on the configuration and type of computer system 1600, system memory 1610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1604. In some implementations, system memory 1610 may include multiple different types of memory, such as static random access memory (SRAM) or dynamic random access memory (DRAM). In some implementations, a basic input/output system (BIOS), containing the basic routines that help to transfer information between elements within computer system 1600, such as during start-up, may typically be stored in the ROM. By way of example, and not limitation, system memory 1610 also illustrates application programs 1612, which may include client applications, Web browsers, mid-tier applications, relational database management systems (RDBMS), etc., program data 1614, and an operating system 1616. Program data 1614 can include software code to implement a de-biasing technique disclosed herein (e.g., part or all of one or more of processes 400, 500, 600, 700, 800, and/or 900 and/or one or more techniques performed by bias mitigation system 120. By way of example, operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1618 may also provide a tangible computer-readable storage medium for storing the basic programming and data constructs that provide the functionality of some embodiments. Software (programs, code modules, instructions) that when executed by a processor provide the functionality described above may be stored in storage subsystem 1618. These software modules or instructions may be executed by processing unit 1604. Storage subsystem 1618 may also provide a repository for storing data used in accordance with the present invention.

Storage subsystem 1618 may also include a computer-readable storage media reader 1220 that can further be connected to computer-readable storage media 1622. Together and, optionally, in combination with system memory 1610, computer-readable storage media 1622 may comprehensively represent remote, local, fixed, and/or removable storage devices plus storage media for temporarily and/or more permanently containing, storing, transmitting, and retrieving computer-readable information.

Computer-readable storage media 1622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information, and which can be accessed by computing system 1600.

By way of example, computer-readable storage media 1622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid-state RAM, dynamic RAM, static RAM, DRAM-based SSDs, magneto resistive RAM (MRAM) SSDs, and hybrid SSDs that use a combination of DRAM and flash memory-based SSDs. The disk drives and their associated computer-readable media may provide non-volatile storage of computer-readable instructions, data structures, program modules, and other data for computer system 1600.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some embodiments communications subsystem 1624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1624 can provide wired network connectivity (e.g., Ethernet) in addition to or instead of a wireless interface.

In various embodiments, communications subsystem 1624 may also receive input communication in the form of structured and/or unstructured data feeds 1626, event streams 1628, event updates 1630, and the like on behalf of one or more users who may use computer system 1600.

By way of example, communications subsystem 1624 may be configured to receive data feeds 1626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
   detecting multiple class attributes using multiple sets of user data, wherein, for each class attribute of the multiple class attributes, at least one of the multiple sets of user data includes the class attribute;
   determining, for at least a selected class attribute of the multiple class attributes, one or more bias metrics that estimate a degree to which a particular workflow is biased in association with the class attribute, wherein the particular workflow is configured to transform an input data set based at least in part on bias mitigation applied during two or more processing stages of a set of processing stages, wherein each user of the set of users is associated with a set of user data of the multiple sets of user data that is to be processed by the particular workflow, and wherein at least one of the two or more processing stages of the set of processing stages includes executing a machine-learning model, and wherein at least one other of the two or more processing stages of the set of processing stages occurs before or after the executing the machine-learning model;
   detecting that a bias-mitigation option has been selected, wherein the selected bias-mitigation option corresponds to a specific class attribute of the multiple class attributes;
   for each processing stage of the two or more processing stages of the set of processing stages:
      selecting a de-biasing technique, wherein the de-biasing technique is selected based on a configurable level that balances a particular fairness metric and an accuracy of metrics that are available to be accounted for, and also based on whether the input data set is allowed to be modified or not; and
      modifying the processing stage by applying the de-biasing technique to the processing stage; and
   applying a modified version of the particular workflow to each of a set of the input data set, wherein the modified version of the particular workflow includes the modified processing stages.

2. The computer-implemented method of claim 1, further comprising:
   causing an interface to be transmitted to a client device for selecting one or more class attributes of the multiple class attributes, wherein the one or more class attributes includes the selected class attribute.

3. The computer-implemented method of claim 2, further comprising:
   quantifying a degree of bias omitted via using the modified version of the particular workflow in lieu of the particular workflow; and
   presenting a display for comparing a candidate output of the modified version of the particular workflow to a candidate output of the particular workflow, wherein the comparing includes the degree of bias.

4. The computer-implemented method of claim 1, wherein:
   the set of processing stages used by the particular workflow includes a pre-processing stage that accesses training data that is used to train the machine-learning model; and
   modifying the pre-processing stage by applying the de-biasing technique selected for the pre-processing stage, wherein the de-biasing technique selected for the pre-processing stage includes:
   under- or over-sampling a portion of the training data; or
   facilitating expanding the training data to include training data elements that have one or more particular characteristics that are relatively underrepresented in the training data.

5. The computer-implemented method of claim 1, wherein:
   the set of processing stages used by the particular workflow includes a pre-processing stage that accesses training data that is used to train the machine-learning model,
   preliminarily generating a modified version of the training data in association with the specific class attribute by:
   under- or over-sampling a portion of the training data associated with the specific class attribute; or
   facilitating expanding the training data to include additional training data elements that are associated with the specific class attribute; and
   storing the modified training data;
   wherein the two or more processing stages of the set of processing stages includes the pre-processing stage, and wherein modifying the pre-processing stage includes retrieving the modified training data and availing the modified training data for training the machine-learning model.

6. The computer-implemented method of claim 1, wherein:
   the two or more processing stages of the set of processing stages includes:
   a pre-processing stage to pre-process training data;
   an in-processing stage to train a machine-learning model and define a set of parameters to be used by the machine-learning model; and
   a post-processing stage to transform an output from the machine-learning model into a result that is returned to a client device or that specifies at least part of a subsequent action.

7. The computer-implemented method of claim 1, further comprising, for each processing stage of the two or more processing stages of the set of processing stages:
   identifying a set of preliminary de-biasing techniques associated with the processing stage;
   determining, for each preliminary de-biasing technique of the set of preliminary de-biasing techniques, a preliminary de-biasing metric that characterizes a degree to which applying the preliminary de-biasing technique to the processing stage changes a bias associated with the class specific attribute; and
   automatically selecting, based on the preliminary de-biasing metrics, a particular de-biasing technique of the set of preliminary de-biasing techniques to be applied for the processing stage.

8. The computer-implemented method of claim 1, wherein, for each processing stage of the two or more processing stages of the set of processing stages, the debiasing technique balances the particular fairness metric and the accuracy of metrics that are available to be accounted for based at least in part on a loss function that prioritizes a weighted average of accuracy and fairness.

9. The computer-implemented method of claim 1, wherein, for each processing stage of the two or more processing stages of the set of processing stages, the de-biasing technique balances the particular fairness metric and the accuracy of metrics that are available to be accounted for based at least in part on a fitting technique that prioritizes a weighted average of accuracy and fairness.

10. The computer-implemented method of claim 1, wherein, for each processing stage of the two or more processing stages of the set of processing stages, the de-biasing technique balances the particular fairness metric and the accuracy of metrics that are available to be accounted for based at least in part on first configuring a workflow using a first metric of the particular fairness metric or the accuracy of metrics that are available to be accounted for and then modifying the workflow based at least in part on a different metric of the particular fairness metric or the accuracy of metrics that are available to be accounted for.

11. The computer-implemented method of claim 1, wherein the de-biasing technique is selected based at least in part on both a minimum accepted level of the particular fairness metric and a minimum accepted level of the metrics that are available to be accounted for.

12. The computer-implemented method of claim 1, further comprising generating a set of synthetic data to include each class attribute of the multiple class attributes and validating that the configurable level is satisfied for the set of synthetic data.

13. A system comprising:
one or more data processors; and
a non-transitory computer-readable storage medium containing instructions that, when executed on the one or more data processors, cause the one or more data processors to perform a set of operations including:
detecting multiple class attributes using multiple sets of user data, wherein, for each class attribute of the multiple class attributes, at least one of the multiple sets of user data includes the class attribute;
determining, for at least a selected class attribute of the multiple class attributes, one or more bias metrics that estimate a degree to which a particular workflow is biased in association with the class attribute, wherein the particular workflow is configured to transform an input data set based at least in part on bias mitigation applied during two or more processing stages of a set of processing stages, wherein each user of the set of users is associated with a set of user data of the multiple sets of user data that is to be processed by the particular workflow, and wherein at least one of the two or more processing stages of the set of processing stages includes executing a machine-learning model, and wherein at least one other of the two or more processing stages of the set of processing stages occurs before or after the executing the machine-learning model;
detecting that a bias-mitigation option has been selected, wherein the selected bias-mitigation option corresponds to a specific class attribute of the multiple class attributes;
for each processing stage of the two or more processing stages of the set of processing stages:
selecting a de-biasing technique, wherein the de-biasing technique is selected based on a configurable level that balances a particular fairness metric and an accuracy of metrics that are available to be accounted for, and also based on whether the input data set is allowed to be modified or not; and
modifying the processing stage by applying the de-biasing technique to the processing stage; and
applying a modified version of the particular workflow to each of a set of the input data set, wherein the modified version of the particular workflow includes the modified processing stages.

14. The system of claim 13, wherein the set of operations further includes:
causing an interface to be transmitted to a client device for selecting one or more class attributes of the multiple class attributes, wherein the one or more class attributes includes the selected class attribute.

15. The system of claim 14, wherein the set of operations further includes:
quantifying a degree of bias omitted via using the modified version of the particular workflow in lieu of the particular workflow; and
presenting a display for comparing a candidate output of the modified version of the particular workflow to a candidate output of the particular workflow, wherein the comparing includes the degree of bias.

16. The system of claim 13, wherein:
the set of processing stages used by the particular workflow includes a pre-processing stage that accesses training data that is used to train the machine-learning model; and
modifying the pre-processing stage by applying the de-biasing technique selected for the pre-processing stage, wherein the de-biasing technique selected for the pre-processing stage includes:
under- or over-sampling a portion of the training data; or
facilitating expanding the training data to include training data elements that have one or more particular characteristics that are relatively underrepresented in the training data.

17. The system of claim 13, wherein:
the set of processing stages used by the particular workflow includes a pre-processing stage that accesses training data that is used to train the machine-learning model,
preliminarily generating a modified version of the training data in association with the specific class attribute by:
under- or over-sampling a portion of the training data associated with the specific class attribute; or
facilitating expanding the training data to include additional training data elements that are associated with the specific class attribute; and
storing the modified training data;
wherein the two or more processing stages of the set of processing stages includes the pre-processing stage, and wherein modifying the pre-processing stage includes retrieving the modified training data and availing the modified training data for training the machine-learning model.

18. The system of claim 13, wherein:
the two or more processing stages of the set of processing stages includes:
a pre-processing stage to pre-process training data;
an in-processing stage to train a machine-learning model and define a set of parameters to be used by the machine-learning model; and a post-processing stage to transform an output from the machine-learning model into a result that is returned to a client device or that specifies at least part of a subsequent action.

19. The system of claim 13, wherein the set of operations further includes, for each processing stage of the two or more processing stages of the set of processing stages:
   identifying a set of preliminary de-biasing techniques associated with the processing stage;
   determining, for each preliminary de-biasing technique of the set of preliminary de-biasing techniques, a preliminary de-biasing metric that characterizes a degree to which applying the preliminary de-biasing technique to the processing stage changes a bias associated with the specific class attribute; and
   automatically selecting, based on the preliminary de-biasing metrics, a particular de-biasing technique of the set of preliminary de-biasing techniques to be applied for the processing stage.

20. A computer-program product tangibly embodied in a non-transitory machine-readable storage medium, including instructions configured to cause one or more data processors to perform a set of operations including:
   detecting multiple class attributes using multiple sets of user data, wherein, for each class attribute of the multiple class attributes, at least one of the multiple sets of user data includes the class attribute;
   determining, for at least a selected class attribute of the multiple class attributes, one or more bias metrics that estimate a degree to which a particular workflow is biased in association with the class attribute, wherein the particular workflow is configured to transform an input data set based at least in part on bias mitigation applied during two or more processing stages of a set of processing stages, wherein each user of the set of users is associated with a set of user data of the multiple sets of user data that is to be processed by the particular workflow, and wherein at least one of the two or more processing stages of the set of processing stages includes executing a machine-learning model, and wherein at least one other of the two or more processing stages of the set of processing stages occurs before or after the executing the machine-learning model;
   detecting that a bias-mitigation option has been selected, wherein the selected bias-mitigation option corresponds to a specific class attribute of the multiple class attributes;
   for each processing stage of the two or more processing stages of the set of processing stages:
      selecting a de-biasing technique, wherein the de-biasing technique is selected based on a configurable level that balances a particular fairness metric and an accuracy of metrics that are available to be accounted for, and also based on whether the input data set is allowed to be modified or not; and
      modifying the processing stage by applying the de-biasing technique to the processing stage; and
   applying a modified version of the particular workflow to each of a set of the input data set, wherein the modified version of the particular workflow includes the modified processing stages.

21. The computer-program product of claim 20, wherein the selection of the bias-mitigation option is detected subsequent to an identification of the particular workflow and to a definition of the set of users and prior to any implementation of the particular workflow for processing data corresponding to the set of users.

22. The computer-program product of claim 20, wherein the set of operations further includes:
   detecting that a bias associated with the class attribute is correlated with a bias associated with another class attribute, wherein the other class attribute is defined to be a protected class attribute; and
   in response to the detection, modifying the particular workflow so as to remove dependency on the other class attribute.

23. The computer-program product of claim 20, wherein the set of operations further includes:
   causing an interface to be transmitted to a client device for selecting one or more class attributes of the multiple class attributes, wherein the one or more class attributes includes the selected class attribute.

24. The computer-program product of claim 23, wherein the set of operations further includes:
   quantifying a degree of bias omitted via using the modified version of the particular workflow in lieu of the particular workflow; and
   presenting a display for comparing a candidate output of the modified version of the particular workflow to a candidate output of the particular workflow, wherein the comparing includes the degree of bias.

25. The computer-program product of claim 20, wherein:
   the set of processing stages used by the particular workflow includes a pre-processing stage that accesses training data that is used to train the machine-learning model; and
   modifying the pre-processing stage by applying the de-biasing technique selected for the pre-processing stage, wherein the de-biasing technique selected for the pre-processing stage includes:
   under- or over-sampling a portion of the training data; or
   facilitating expanding the training data to include training data elements that have one or more particular characteristics that are relatively underrepresented in the training data.

* * * * *